US010120462B2

(12) United States Patent
Miyazawa et al.

(10) Patent No.: US 10,120,462 B2
(45) Date of Patent: Nov. 6, 2018

(54) INFORMATION PROCESSING APPARATUS, PROGRAM, AND CONTROL METHOD

(71) Applicant: SONY CORPORATION, Tokyo (JP)

(72) Inventors: Yusuke Miyazawa, Tokyo (JP); Seiji Suzuki, Kanagawa (JP); Yasushi Okumura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/710,088

(22) Filed: Sep. 20, 2017

(65) Prior Publication Data
US 2018/0011554 A1 Jan. 11, 2018

Related U.S. Application Data

(63) Continuation of application No. 15/429,400, filed on Feb. 10, 2017, which is a continuation of application (Continued)

(30) Foreign Application Priority Data

Sep. 7, 2010 (JP) ................. 2010-199819

(51) Int. Cl.
G06F 3/0346 (2013.01)
G06F 1/16 (2006.01)
(Continued)

(52) U.S. Cl.
CPC .......... G06F 3/0346 (2013.01); G06F 1/1626 (2013.01); G06F 3/041 (2013.01); G06F 3/0416 (2013.01); G06F 3/04815 (2013.01); G06F 2200/1637 (2013.01); G06F 2203/04802 (2013.01)

(58) Field of Classification Search
CPC ... G06F 3/0346; G06F 3/0416; G06F 3/04815
See application file for complete search history.

(56) References Cited

U.S. PATENT DOCUMENTS 7,543,245 B2   6/2009  Irimajiri
7,761,813 B2   7/2010  Kim et al.
(Continued)

FOREIGN PATENT DOCUMENTS

EP    1780633 A2    5/2007
JP    2004-164375   6/2004
(Continued)

OTHER PUBLICATIONS

Mar. 4, 2014, Japanese Office Action for related JP application No. 2010-199819.
(Continued)

Primary Examiner — Dennis Joseph
(74) Attorney, Agent, or Firm — Paratus Law Group, PLLC

(57) ABSTRACT

An information processing apparatus includes a display, a sensor, and a controller. The display has a screen. The sensor is configured to detect an inclination. The controller is configured to display a first object on the screen and display a second object associated with the first object on the screen in accordance with the inclination detected by the sensor.

30 Claims, 23 Drawing Sheets

Related U.S. Application Data

No. 14/317,488, filed on Jun. 27, 2014, now abandoned, which is a continuation of application No. 13/212,362, filed on Aug. 18, 2011, now Pat. No. 8,786,636.

(51) Int. Cl.
  *G06F 3/041*   (2006.01)
  *G06F 3/0481*  (2013.01)

(56) References Cited

U.S. PATENT DOCUMENTS

| | | |
|---|---|---|
| 8,543,415 B2 | 9/2013 | Venon et al. |
| 8,847,992 B2 | 9/2014 | Kornmann et al. |
| 8,947,355 B1 | 2/2015 | Karakotsios |
| 2002/0140666 A1 | 10/2002 | Bradski |
| 2007/0124699 A1 | 5/2007 | Michaels |
| 2009/0002391 A1 | 1/2009 | Williamson et al. |
| 2009/0187862 A1 | 7/2009 | DaCosta |
| 2010/0064259 A1 | 3/2010 | Alexanderovitc et al. |
| 2010/0066763 A1 | 3/2010 | MacDougall et al. |
| 2010/0088639 A1 | 4/2010 | Yach et al. |
| 2010/0093400 A1 | 4/2010 | Ju et al. |
| 2010/0125816 A1 | 5/2010 | Bezos |
| 2010/0131904 A1 | 5/2010 | Fong et al. |
| 2011/0248987 A1 | 10/2011 | Mitchell |
| 2012/0026098 A1 | 2/2012 | Ladouceur et al. |
| 2012/0054690 A1* | 3/2012 | Lim .................... G06F 3/012 715/852 |

FOREIGN PATENT DOCUMENTS

| | | |
|---|---|---|
| JP | 2005-009441 | 1/2005 |
| JP | 2009-017486 | 1/2009 |
| JP | 2009-254469 | 11/2009 |
| TW | 591412 | 6/2004 |
| TW | 200532479 | 10/2005 |
| WO | WO2010/012097 A1 | 2/2010 |

OTHER PUBLICATIONS

Sep. 30, 2014, Japanese Office Action for related JP application No. 2010-199819.
Feb. 18, 2015, Extended European Search Report for related EP application No. 11179465.7.
Jul. 20, 2015, Chinese Office Action for related CN application No. 201110259946.6.

* cited by examiner

INFORMATION PROCESSING APPARATUS, PROGRAM, AND CONTROL METHOD

CROSS-REFERENCE TO PRIOR APPLICATION

This application is a continuation of U.S. patent application Ser. No. 15/429,400 (filed on Feb. 10, 2017), which is a continuation of U.S. patent application Ser. No. 14/317,488 (filed on Jun. 27, 2014), which is a continuation of U.S. patent application Ser. No. 13/212,362 (filed on Aug. 18, 2011 and issued as U.S. Pat. No. 8,766,636 on Jul. 22, 2014), which claims priority to Japanese Patent Application No. 2010-199819 (filed on Sep. 7, 2010), which are all hereby incorporated by reference in their entirety.

BACKGROUND

The present disclosure relates to an information processing apparatus including a display and a touch panel, a program, and a control method.

From the past, there has been widely known an information processing apparatus including a display such as an LCD (Liquid Crystal Display), and a touch panel that detects a contact position on a screen of the display (see, for example, Japanese Patent Application Laid-open No. 2005-09441).

When making an input operation on an information processing apparatus including a display and a touch panel, a user touches a screen of the display with a finger, a stylus, or the like or slides a finger, a stylus, or the like thereon, thus making an input operation on the information processing apparatus.

SUMMARY

It is desirable to provide an information processing apparatus adopting, as an unprecedented new input system, an input system using a combination of an input operation scads by inclining the information processing apparatus and an input operation made via a touch panel.

According to an embodiment of the present disclosure, there is provided an information processing apparatus including a display, a sensor, and a controller.

The display has a screen.

The sensor is configured to detect an inclination.

The controller is configured to display a first object on the screen and display a second object associated with the first object on the screen in accordance with the inclination detected by the sensor.

In the information processing apparatus, when a user inclines the information processing apparatus, the second object is displayed on the screen in accordance with the inclination.

The information processing apparatus may further include a touch panel configured to detect contact.

In this case, the second object may be an object operable with the touch panel.

In the information processing apparatus, the controller may switch availability of an operation of the second object using the touch panel in accordance with the inclination.

Accordingly, the user inclines the information processing apparatus to display the second object on the screen, and makes an input operation with a finger or the like via the touch panel to operate the second object.

In the information processing apparatus, the first object may be an object operable with the touch panel.

In the information processing apparatus, the controller may switch a first state where the first object is operable with the touch panel and a second state where the second object is operable with the touch panel in accordance with the inclination.

In the information processing apparatus, when an input operation is made with use of the touch panel within the same display area on the screen, an object to be operated can be differentiated depending on an angle of the inclination of the information processing apparatus. Accordingly, the limited screen can be effectively utilized.

In the information processing apparatus, the controller may display in a rotational manner a three-dimensional display object having a first surface serving as the first object and a second surface serving as the second object in accordance with the inclination, to thereby display the second object on the screen in accordance with the inclination.

In the information processing apparatus, when the user inclines the information processing apparatus, the three-dimensional display object is rotated in accordance with the inclined angle. Accordingly, the operation becomes intuitive.

In the information processing apparatus, the controller may control display such that the three-dimensional display object is hardly rotated in a case where an angle of the inclination is less than a predetermined value, and such that a rotation speed of the three-dimensional display object becomes higher as the inclination increases in a case where the angle of the inclination is the predetermined value or more.

In the information processing apparatus, in the case where an angle of the inclination of the information processing apparatus is less than a predetermined threshold value, the three-dimensional display object is hardly rotated and accordingly the three-dimensional display object can be prevented from being rotated by an unintentional hand movement or the like. On the other hand, in the case where the angle of the inclination of the information processing apparatus is the predetermined threshold value or more, the rotation speed of the three-dimensional display object becomes higher as the inclination increases. Accordingly, in the case where the user expresses his/her intention to rotate the three-dimensional display object and then rotates the casing, the three-dimensional display object can be appropriately rotated in accordance with the user's intention of rotation.

In the information processing apparatus, the controller may determine a position of a virtual camera in accordance with the inclination, and change a background image of the three-dimensional display object in accordance with the position of the virtual camera.

Accordingly, when the user inclines the information processing apparatus, the three-dimensional display object is displayed in a rotational manner, and the background image of the three-dimensional display object is changed in accordance with the position of the virtual camera. Accordingly, the feeling of rotating the three-dimensional display object can be improved.

In the information processing apparatus, the controller may move the first object and the second object in directions different from each other in accordance with the inclination, to thereby display the second object on the screen in accordance with the inclination.

In the information processing apparatus, when the user inclines the information processing apparatus, the first object and the second object are moved in parallel to each other on the screen in accordance with the inclined angle.

Also in such a case, an operation becomes instinctive. For example, the user can obtain the feeling as if to open a door (first object).

In the information processing apparatus, the controller may move the first object while rotating the first object.

Accordingly, the feeling of opening a door is improved.

In the information processing apparatus, the first object may be an image displayed when content is reproduced.

In this case, the second object may be an object for operating a reproduction position of the content.

In this case, the controller may change, in a case where the second object is operated with the touch panel, the reproduction position in accordance with a change amount of a contact position of the touch panel.

In the information processing apparatus, the controller may change a ratio of a change amount of the reproduction position of the content to the change amount of the contact position of the touch panel, inn, accordance with the inclination.

Accordingly, by inclining the information processing apparatus, the user can optionally change the ratio of the change amount of the reproduction position of the content to the change amount of the contact position of the touch panel.

In the information processing apparatus, the controller may simultaneously execute a plurality of application programs.

In this case, the first object may be an image displayed by one of the plurality of application programs.

In this case, the second object may be an image for selecting one of the plurality of application programs.

Accordingly, by inclining the information processing apparatus and making an input via the touch panel, the user can select an optional application.

In the information processing apparatus, the first object may be an image indicating content.

In this case, the second object may be an icon for deleting content.

Accordingly, in the case where the user does not intend to delete content, the content can be prevented from being deleted mistakenly.

In the information processing apparatus, the controller may be capable of updating a reference point serving as a reference of the inclination.

In the information processing apparatus, the controller may determine whether an angle of the inclination is a predetermined threshold value or more, and update the reference point when the angle of the inclination is the predetermined threshold value or more.

Accordingly, in the case where an operation position of the information processing apparatus is changed, the change of the operation position can be appropriately supported.

In the information processing apparatus, the controller may determine whether the contact with the touch panel is not detected for a predetermined period of time or more and update, in the case where the contact is not detected for the predetermined period of time or more, a position of the information processing apparatus at that time as the reference point.

Accordingly, in the case where the operation position of the information processing apparatus is changed, the change of the operation position can be appropriately supported.

In the information processing apparatus, the controller may determine whether a change amount of the inclination is less than a predetermined threshold value within a predetermined period of time and update, in the case where an angle of the inclination is less than the predetermined threshold value, a position a the information processing apparatus at that time as the reference point.

Accordingly, in the case where the operation position of the information processing apparatus is changed, the change of the operation position can be appropriately supported.

According to an embodiment of the present disclosure, there is provided a program causing an information processing apparatus to execute displaying a first object on a screen of a display.

Further, a second object associated with the first object is displayed on the screen in accordance with an inclination detected by a sensor.

According to an embodiment of the present disclosure, there is provided a control method including displaying a first object on a screen of a display.

A second object associated with the first object is displayed on the screen in accordance with an inclination detected by a sensor.

As described above, according to one of the embodiments of the present disclosure, it is possible to provide an information processing apparatus adopting, as an unprecedented new input system, an input system using a combination of an input operation made by inclining the information processing apparatus and an input operation made via a touch panel.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, embodiments of the present disclosure will be described with reference to the drawings.

First Embodiment

Figure 1:
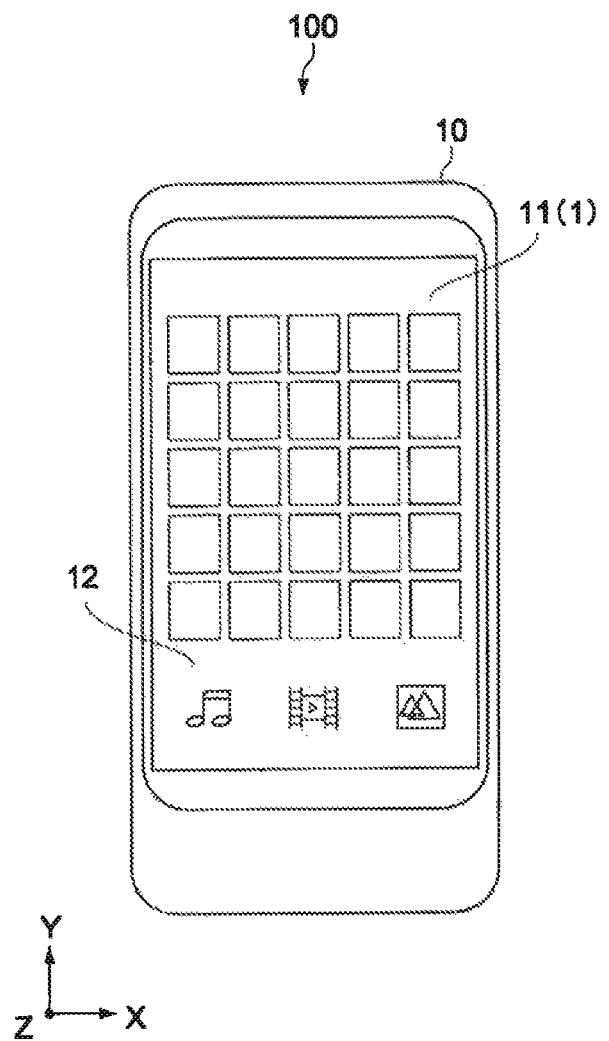
FIG. 1 is a front view showing an information processing apparatus according to an embodiment of the present disclosure.

FIG. 1 is a front view showing an information processing apparatus 100 according to a first embodiment of the present disclosure.

As shown in FIG. 1, the information processing apparatus 100 includes a plate-like casing 10 that is thin in a z-axis direction. Inside the casing 10, a display 11 including a screen 1 is arranged. On the display 11, a touch panel 12 that detects a contact position of a user's finger or a stylus is arranged. A receiver (not shown) is provided in the vicinity of an upper end portion of the casing 10 on the front side. A mouthpiece (not shown) is provided in the vicinity of a lower end portion of the casing 10 on the front side.

The display 11 is constituted of, for example, a liquid crystal display or an EL (Electro-Luminescence) display. Examples of the touch panel 12 include a resistive touch panel 12 and a capacitive touch panel 12, but the touch panel 12 may have any touch panel system.

Figure 2:
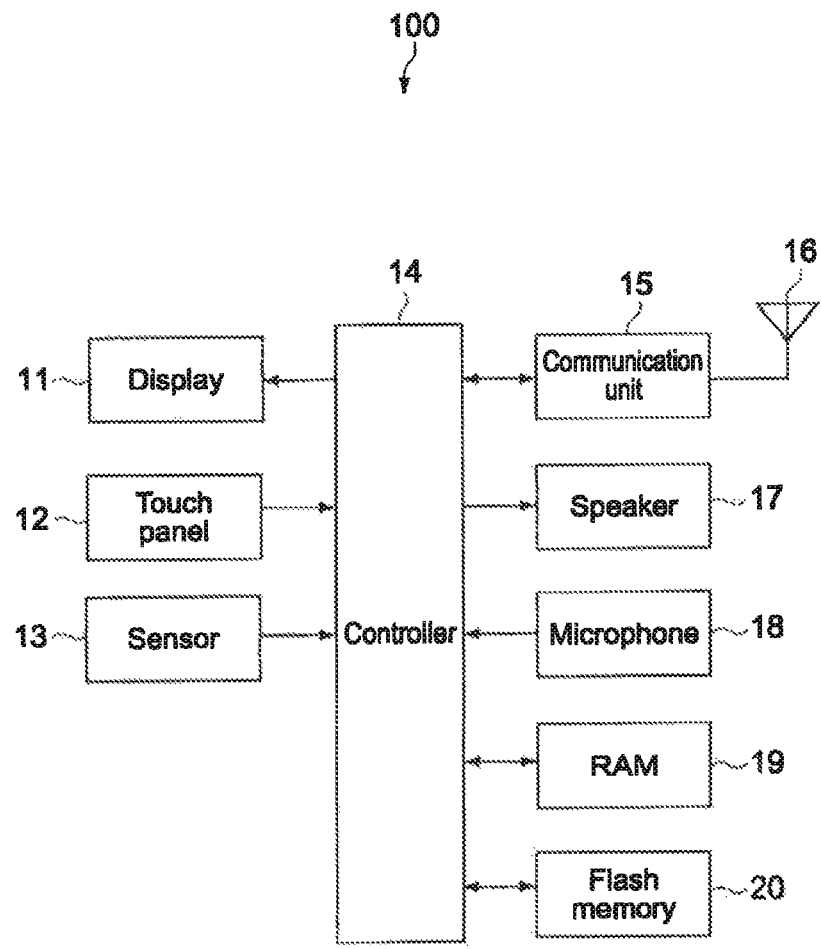
FIG. 2 is a block diagram showing an electrical configuration of the information processing apparatus.

FIG. 2 is a block diagram showing an electrical configuration of the information processing apparatus 100.

As shown in FIG. 2, the information processing apparatus 100 includes, in addition to the display 11 and touch panel 12 described above, a sensor 13, a controller 14, a communication unit 15, an antenna 16, a speaker 17, a microphone 18, a RAM 10, and a flash memory 20.

The senor 13 is a sensor that detects the inclination of the information processing apparatus (casing). Examples of the sensor 13 include motion sensors such as angular velocity sensors (for example, vibrating gyro sensor, rotary top gyro sensor), acceleration sensors (for example, piezo-resistive type, piezoelectric type, capacitive type), and angular sensors (for example, geomagnetic sensor). The sensor 13 may be a combination of at least two or more motion sensors such as an angular velocity sensor, an acceleration sensor, and an angular sensor.

As the motion sensor, a configuration in which a rotation angle of the casing 10 is detected by one axis, two axes, or three axes is used. The motion sensor may have any configuration, but at least the motion sensor is configured to detect a rotation in the same rotation direction (in this embodiment, about y axis) as the rotation direction of a three-dimensional display object 2 to be described later (see FIGS. 4 and 5).

It should be noted that in the description of the first embodiment, the sensor 13 is described as a motion sensor for triaxial detection for convenience.

The communication unit 15 executes the processing such as frequency conversion of radio waves transmitted or received by the antenna 16, modulation, and demodulation. The antenna 16 transmits or receives radio waves for call or radio waves for packet communication of e-mails, Web data, or the like.

The speaker 17 includes a D/A (digital/analog) converter, an amplifier, or the like. The speaker 17 executes D/A conversion processing and amplification processing with respect to audio data for call, which is input from the controller 14, and outputs audio via the receiver (not shown).

The microphone 18 includes an A/D (analog/digital) converter or the like. The microphone 18 converts analog audio data input by a user via the mouthpiece into digital audio data, and outputs the digital audio data to the controller 14. The digital audio data output to the controller 14 is encoded and then transmitted via the communication unit 15 and the antenna 16.

The RAM 19 (Random Access Memory) is a volatile memory used as a work area of the controller 14. The RAM 19 temporarily stores various programs and various types of data used for processing of the controller 14.

The flash memory 20 is a nonvolatile memory in which various programs and various types of data necessary for processing of the controller 14 are stored.

The controller 14 is constituted of a CPU (Central Processing Unit) or the like. The controller 14 collectively controls units of the information processing apparatus 100, and executes various computations based on various programs.

[Description on Operation]

Figure 3:
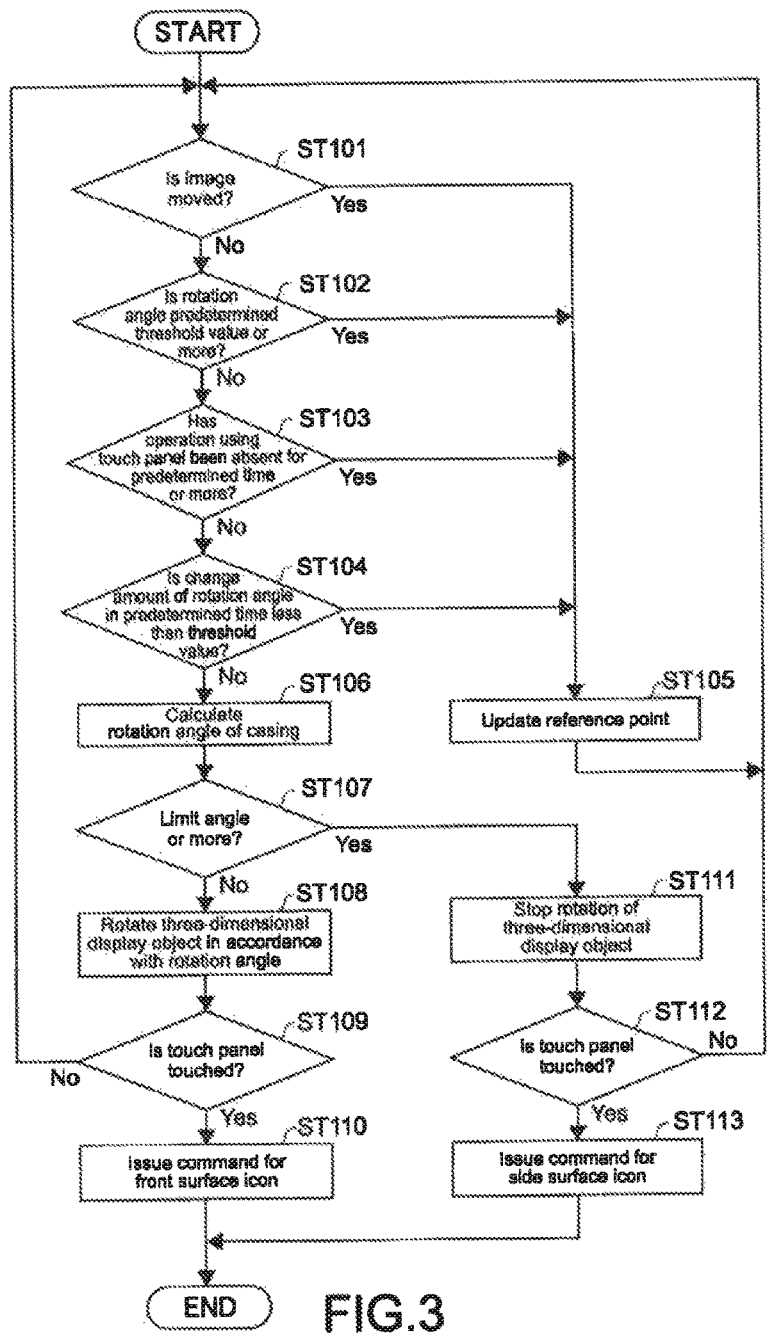
FIG. 3 is a flowchart showing processing of the information processing apparatus.
Figure 4:
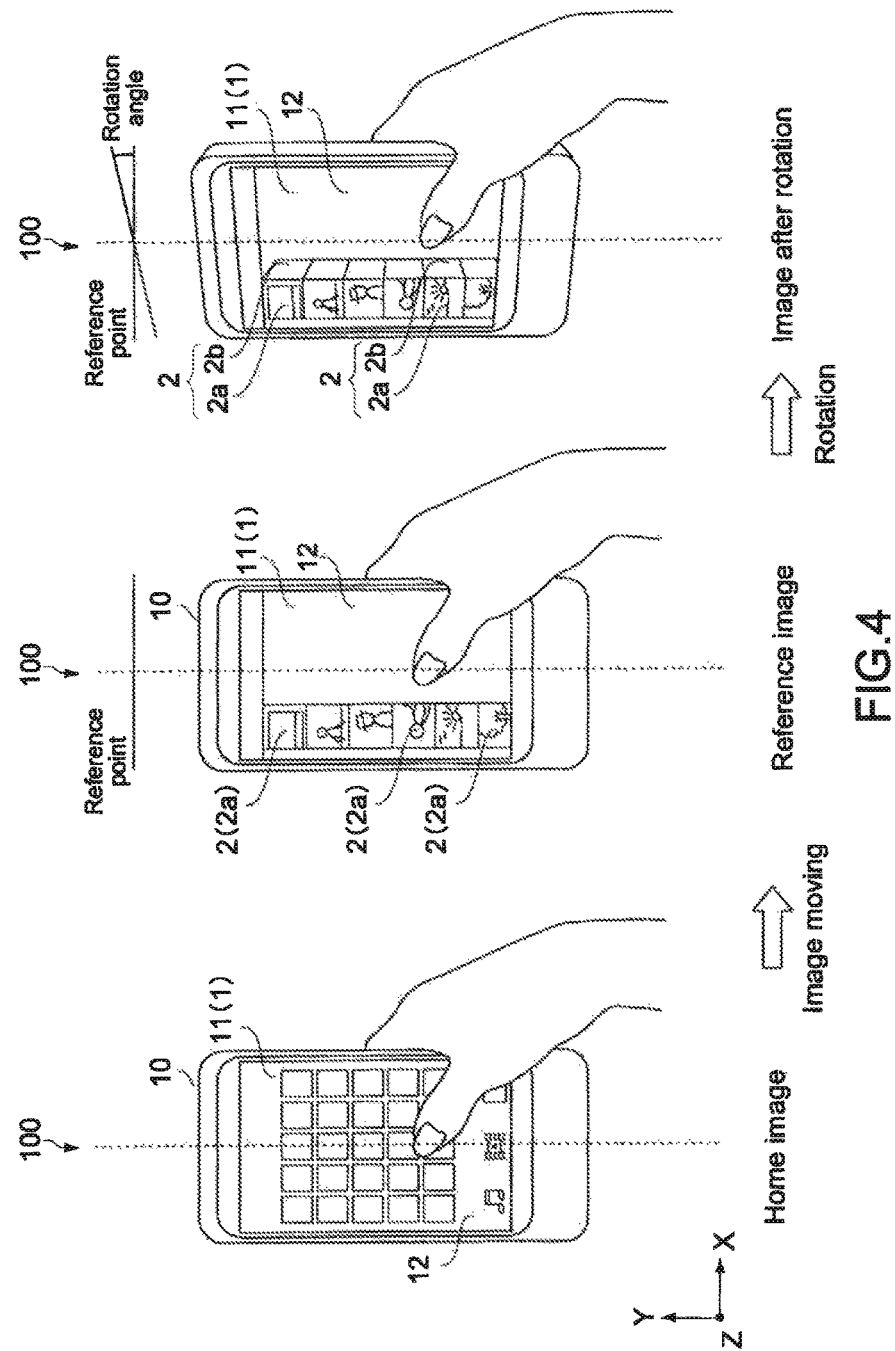
FIG. 4 is a diagram showing display states on a screen in the case where the processing shown in FIG. 3 is executed.
Figure 5:
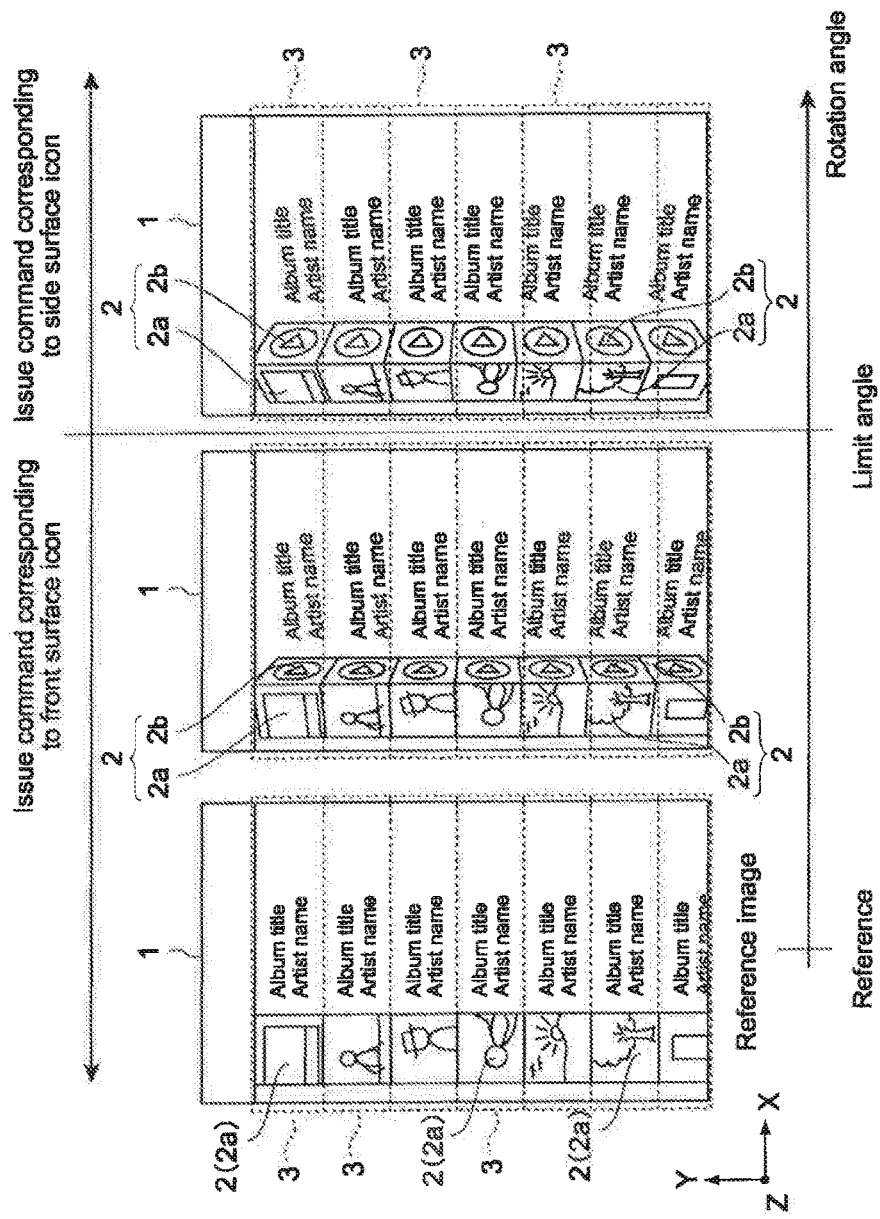
FIG. 5 is a diagram showing display states on the screen in the case where the processing shown in FIG. 3 is executed.

Next, the processing of the information processing apparatus 100 according to the first embodiment will be described. FIG. 3 is a flowchart showing the processing of the information processing apparatus 100. FIGS. 4 and 5 are diagrams each showing display states on a screen in the case where the processing shown in FIG. 3 is executed.

FIG. 4 shows display states on the screen when viewed from the perspective of a user, and FIG. 5 shows display states on the screen when the screen 1 is viewed from the front aide.

As shown in the center and the right part of FIG. 4 and FIG. 5, on the left side area of the screen 1, three-dimensional display objects 2 having a cubic shape are displayed. The three-dimensional display objects 2 are displayed in a rotational manner in accordance with a rotation angle of the casing 10. The plurality of three-dimensional display objects 2 are located along a y-axis direction. The three-dimensional display objects 2 each include a front surface icon 2a (first object) on a front surface (first surface), and a side surface icon 2b (second object) on a side surface (second surface).

In the first embodiment, the front surface icon 2a is an icon of an album, and the side surface icon 2b is an icon of a moving image of a track included in the album. The front surface icon has an image of an album jacket or the like. The side surface icon has an image such as a still image of the moving image.

On the right side of each three-dimensional display object 2, an album title and an artist name are displayed (see FIG. 5).

With reference to FIG. 3, the controller 14 determines whether an image displayed on the screen is moved to another image (Step 101). For example, as shown in the left part of FIG. 4, in the state where a home image is displayed on the screen, a user touches a position where a specific icon is displayed on the screen. Then, the controller 14 moves the display on the screen from the home image to an image as shown in the center of FIG. 4 and the left part of FIG. 5.

When the image is moved (YES of Step 101), the controller 14 updates a reference point, with an angle of the casing 10 at that time as a reference (Step 105). The reference point is a reference angle of the rotation angle of the casing 10.

In the case where the reference point is updated, since the position of the casing 10 at that time is a reference point, the rotation angle of the casing 10 at that time is zero. An image displayed on the screen when the rotation angle from the reference point is zero will be hereinafter referred to as a reference image (see center of FIG. 4 and left part of FIG. 5).

In the reference image, the controller 14 controls the display on the screen such that the front surface of the three-dimensional display object 2 having a cubic shape faces to the front side of the screen 1. In other words, in the case where the rotation angle from the reference point is zero, the controller 14 controls the display on the screen such that the front surface icon 2a (icon of album) arranged on the front side of the three-dimensional display object 2 faces to the front side of the screen 1. It should be noted that in the case where the rotation angle is zero, the controller 14 also displays characters such as an album title and an artist name displayed on the right side of the three-dimensional display object 2 so to be parallel to the front side of the screen 1.

In the case where the determination in Step 101 is negative (NO of Step 101), the controller 14 proceeds to the next Step 102. In Step 102, the controller 14 determines whether the rotation angle from the reference point is changed by a predetermined threshold value (for example, about ±90 degrees about y axis, x axis, and z axis) or more.

In the case where the rotation angle from the reference point is a predetermined threshold value or more (YES of Step 102), the controller 14 updates the reference point (Step 105) and displays the reference image (see center of FIG. 4, and left part of FIG. 5) on the screen.

As described above, in the case where the rotation angle from the reference point is a predetermined threshold value or more, the reference point is updated. As a result, when an operation position of the information processing apparatus 100 is largely changed, for example, when a user lies down, the change of the operation position can be appropriately supported.

In the case where the rotation angle from the reference point is less than a threshold value (NO of Step 102), the controller 14 proceeds to the next Step 103. In Step 103, the controller 14 determines whether an operation with use of the touch panel 12 has been absent for a predetermined period of time (for example, about two seconds to three seconds) or more based on an output from the touch panel 12.

In the case where art operation with use of the touch panel 12 has been absent for a predetermined period of time or more (YES of Step 103), the reference point is updated using the position of the casing 10 at that time (Step 105). Accordingly, when the operation position of the information processing apparatus 100 is changed, the change of the operation position can be appropriately supported.

In the case where an operation with use of the touch panel 12 has been made in the predetermined period of time (NO of Step 103), the controller 14 proceeds to the next Step 104. In Step 104, the controller 14 determines whether a change amount of the rotation angle is less than a predetermined threshold value (for example, about ±5 degrees about y axis, x axis, and z axis) in a predetermined period of time (for example, about two seconds to three seconds).

In the case where a change amount of the rotation angle in a predetermined period of time is less than a predetermined threshold value (YES of Step 104), the controller 14 updates the reference point using the position of the casing 10 at that time and displays a reference image on the screen. Accordingly, when the operation position of the information processing apparatus 100 is changed, the change of the operation position can be appropriately supported.

In the case where a change amount of the rotation angle in a predetermined period of time is a predetermined threshold value or more (NO of Step 104), the controller 14 proceeds to the next Step 106. In Step 106, the controller 14 calculates a rotation angle of the casing 10 from the reference point based on an output from the sensor 13 (motion sensor). In this case, the controller 14 calculates a rotation angle of the casing 10 about the y axis.

Next, the controller 14 determines whether the rotation angle of the casing 10 is a limit angle (for example, about 20 degrees to 45 degrees) or more (Step 107). In the case where the rotation angle is less than a limit angle (NO of Step 107), the controller 14 controls the display such that the three-dimensional display object 2 is rotated in accordance with the rotation angle (Step 108) (see FIGS. 4 and 5). The controller 14 may also display in a rotational manner characters such as an album title and an artist name in accordance with the rotation angle.

Figure 6:
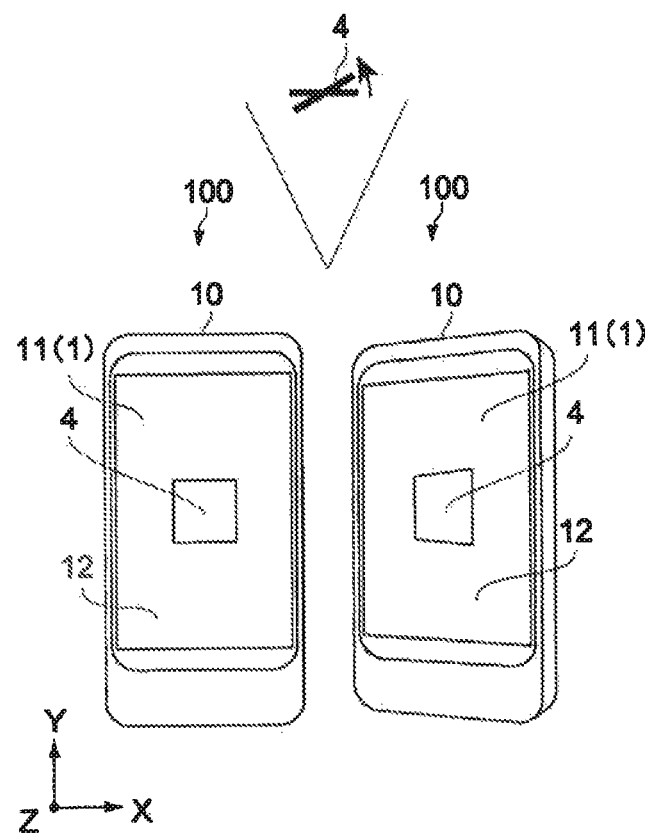
FIG. 6 is a diagram for explaining the principle used for displaying in a rotational manner objects constituting respective surfaces of a three-dimensional display object or objects such as an album title and an artist name.

FIG. 6 is a diagram for explaining the principle used for displaying in a rotational manner objects constituting the respective surfaces 2a and 2b of the three-dimensional display object 2 or objects such as an album title and an artist name. It should be noted that in the following description, objects constituting the respective surfaces 2a and 2b of the three-dimensional display object 2 or objects such as an album title and an artist name, which are rotated or moved in accordance with a rotation operation of the casing 10, will be hereinafter referred to as a UI (User Interface) object 4.

In Step 108, based on the rotation angle of the casing 10, the controller 14 calculates a rotation angle of a UI object 4 constituting the surface 2a or 2b of the three-dimensional display object 2 or a UI object 4 such as a name of album (hereinafter, referred to as object rotation angle). Then, the controller 14 displays each UI object 4 in a rotational manner about each axis based on the calculated object rotation angle. Accordingly, the three-dimensional display object 2, the album title, or the like is rotated on the screen in accordance with the rotation angle.

Upon display of the three-dimensional display object 2 in a rotational manner, the side surface icon 2b (icon of a moving image of a track included in the album) hidden in the reference image gradually emerges on the screen as the rotation angle from the reference point increases.

Upon display of the three-dimensional display object 2 in a rotational manner, the controller 14 then determines whether contact of a user's finger or the like is detected with the touch panel 12 (Step 109). In the case where contact is not detected with the touch panel 12 (NO on Step 109), the controller 14 returns to Step 101.

On the other hand, in the case where contact is detected with the touch panel 12 (YES of Step 109), the controller 14 determines where the contact position is located among rectangular divisional areas 3 divided for each album (see undulating line in FIG. 5). Then, a command for a front surface icon 2a (icon of album) displayed at a position corresponding to that divisional area 3 is issued (Step 110).

In other words, in the case where the rotation angle of the casing 10 is less than a limit angle, a state where a front surface icon 2a can be selected and determined (first state) is set. If contact is detected with the touch panel 12 at that time, a command for the front surface icon 2a is issued.

Upon issue of a command for the front surface icon 2a (icon of album), for example, the display on the screen is moved to a selection image of tracks included in the album.

In the case where the rotation angle is a limit angle or more in Step 107 (YES of Step 107), the controller 14 stops rotation of the three-dimensional display object 2 (Step 111). In this way, in the case where the rotation angle is a limit angle or more, the rotation of the three-dimensional display object 2 is stopped, and accordingly a user can stably operate the three-dimensional display object 2. It should be noted that the rotation of the three-dimensional display object 2 is stopped, characters such as an album title and an artist name are also stopped to be rotated.

Next, the controller 14 determines whether contact of a user's finger or the like is detected with the touch panel 12 (Step 112). In the case where contact is not detected with the touch panel 12 (NO of Step 112), the controller 14 returns to Step 101.

On the other hand, in the case where contact is detected with the touch panel 12 (YES of Step 112), the controller 14 determines where the contact position is located among the rectangular divisional areas 3 divided for each album (see undulating line in FIG. 5). Then, a command for a side surface icon 2b (icon of moving image) displayed at a position corresponding to that divisional area 3 is issued (Step 113).

In other words, in the case where the rotation angle of the casing 10 is a limit angle or more, a state where a side surface icon 2b can be selected and determined (second state) is set. If contact is detected with the touch panel 12 at that time, a command for the side surface icon 2b is executed.

In this embodiment, the controller 14 switches between the state where the front surface icon 2a can be selected and determined (first state) and the state where the side surface icon 2b can be selected and determined (second state) with the limit angle as a boundary.

In Step 113, upon issue of the command for the side surface icon 2b (icon of moving image), for example, the display an the screen is moved to a reproduction image of a moving image (moving image of a track included in the album).

[Action Etc.]

In the information processing apparatus 100, in the case where inputs operations such as touch and tap are made with use of the touch panel 12 within the same display area on the screen, an icon to be selected and determined can be differentiated depending on an angle of rotation, which means that different icons are arranged in the same display area. Accordingly, a limited screen area can be used efficiently.

Further, in this embodiment, the icon of the album is arranged on the front surface of the three-dimensional display object 2, and the icon of the moving image is displayed on the side surface thereof. Accordingly, the user can select an optional album or an optional moving image by a rotation operation of the casing 10 and an input operation to the touch panel 12.

Here, in related art, a selection image of albums and a selection image of moving images are generally separated. Therefore, for example, in the case where display is moved from the album selection image to the moving-image selection image or the like, it has been necessary to move from the album selection image to another image such as a home image once, and then move to the moving-image selection image. Therefore, in related art, many touch operations or much screen moving have been necessary at a time of album selection and moving image selection.

On the other hand, in this embodiment, the user can select an optional album or an optional moving image by a rotation operation of the casing 10 and an input operation to the touch panel 12 as described above. In this way, in this embodiment, many touch operations, screen moving, and the like are not necessary at a time of album selection and moving image selection, for example. Therefore, a load on the user can be relieved.

Further, in this embodiment, the front surface icon 2a and the side surface icon 2b are assumed to be a music icon and a moving image icon, respectively, which are related to a common album. Specifically, the front surface icon 2a and the side surface icon 2b are assumed to be icons having mutual association. Accordingly, the user can easily select content mutually associated.

Various Modified Examples of First Embodiment

As described above, the controller 14 calculates an object rotation angle of a UI object 4 (object constituting surface 2a or 2b of the three-dimensional display object 2, or the like) based on the rotation angle of the casing 10 (see Step 108 of FIG. 3, and FIG. 6). Then, the controller 14 displays each UI object 4 in a rotational manner based on the calculated object rotation angle, thus displaying the three-dimensional display object 2 or the like in a rotational manner.

Hereinafter, an example of a method of calculating the object rotation angle of a UI object 4 based on the rotation angle of the casing 10 will be described.

Figure 7:
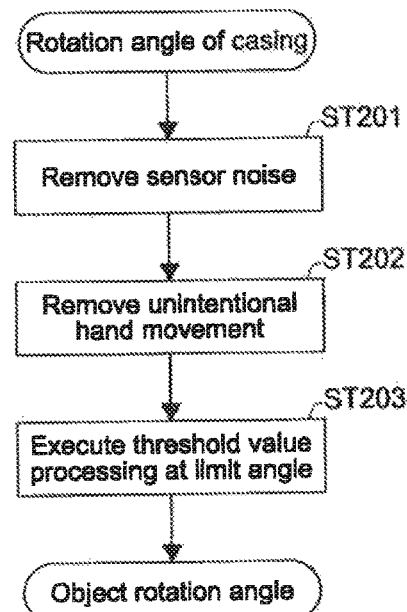
FIG. 7 is a flowchart showing processing when a controller calculates an object rotation angle of a UI (User Interface) object based on a rotation angle of a casing.

FIG. 7 is a flowchart showing processing when the controller 14 calculates an object rotation angle of a UI object 4 based on a rotation angle of the casing 10.

As shown in FIG. 7, the controller 14 acquires the rotation angle of the casing 10 from the sensor 13, and executes processing of removing sensor noise from the rotation angle of the casing 10 (output of sensor 13) (Step 201). In this case, the controller 14 executes processing of averaging the last rotation angle of the casing 10 and the current rotation angle of the casing 10 (low pass filter), thus executing the processing of removing sensor noise.

Next, the controller 14 executes processing of removing an unintentional hand movement and threshold value processing at a limit angle (Step 203, Step 204).

Figure 8:
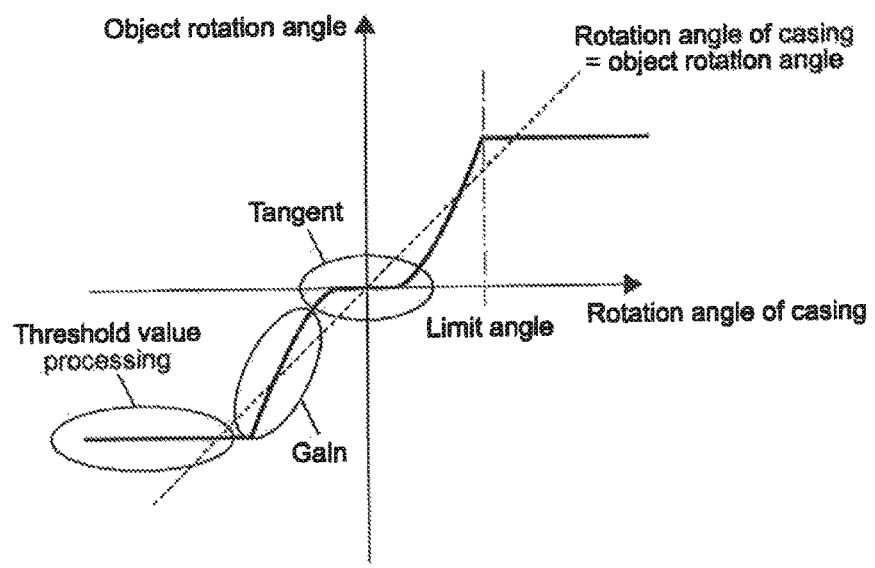
FIG. 8 is a graph showing an expression used for achieving processing of removing an unintentional hand movement and threshold value processing at a limit angle, and showing a relationship between a rotation angle of the casing and an object rotation angle of an UI object.

FIG. 8 is a graph showing an expression used for achieving processing of removing an unintentional hand movement and threshold value processing at a limit angle, and showing a relationship between a rotation angle of the casing 10 and an object rotation angle of the UI object 4.

Expression (1) below is used in FIG. 8.

$$\theta i = a \tan(b \theta d)$$

θd: rotation angle of casing 10 (sensor noise removed)
θi: object rotation angle
a,b: optional constant It should be noted that in the case where the rotation angle of the casing 10 is a limit angle or more, the object rotation angle is set to be constant by the threshold value processing.

As shown in FIG. 8, in the case where the rotation angle of the casing 10 is less than a certain value, the UI object 4 is hardly rotated by Expression (1) described above. Accordingly, the three-dimensional display object 2 or the like can be prevented from being rotated by an unintentional hand movement or the like.

Further, as shown in FIG. 8, in the case where the rotation angle of the casing 10 is a certain value or more, the object rotation angle increases as the rotation angle increases. In this case, the inclination of the graph is sharp an compared to the case where the rotation angle of the casing 10 and the object rotation angle are equal to each other (see broken line of FIG. 8). Accordingly, in the case where a user expresses his/her intention to rotate the three-dimensional display object 2 or the like and then rotates the casing 10, the three-dimensional display object 2 can be appropriately rotated in accordance with the user's intention of rotation.

Further, in the case where the rotation angle of the casing 10 is a limit angle or more, the object rotation angle is set to be constant and the three-dimensional display object 2 or the like is stopped to be rotated. Accordingly, as described above, the user can stably operate the three-dimensional display object 2 or the like.

Here, it is also possible to structure a background image of the three-dimensional display object 2 so as to change in accordance with the rotation angle of the casing 10 from the reference point.

Figure 9:
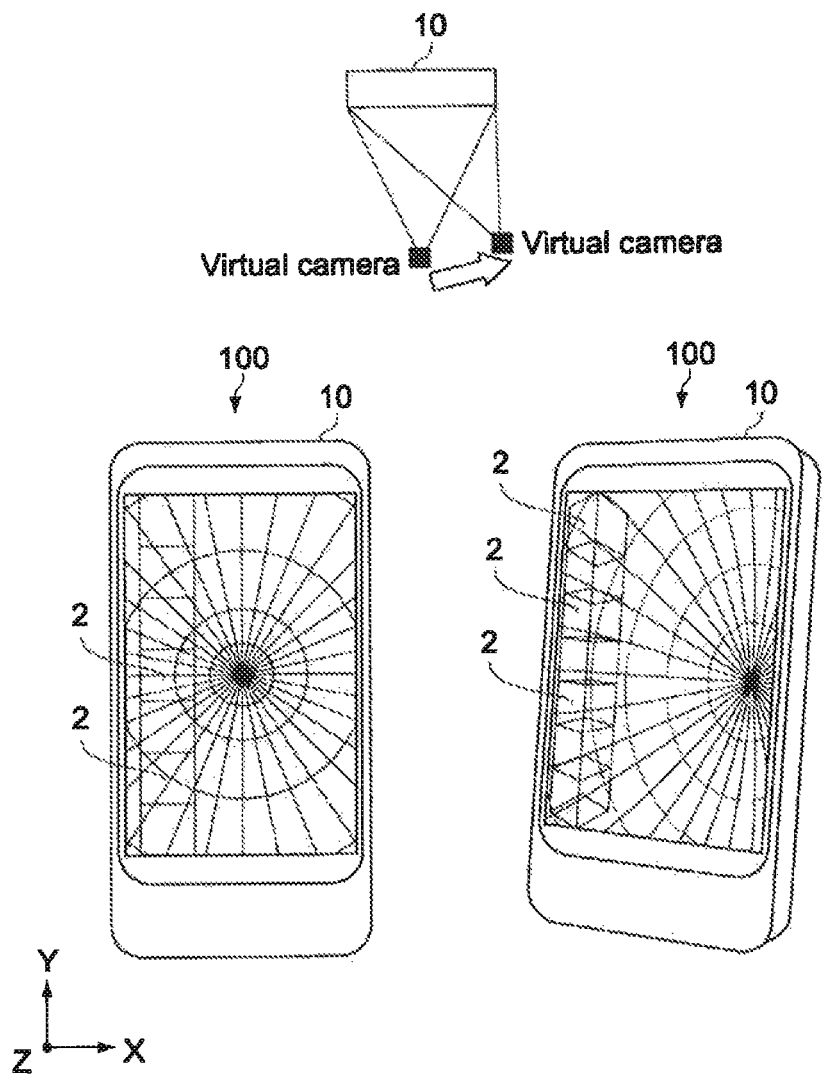
FIG. 9 is a diagram showing an example of a case where a background image of the three-dimensional display object is changed in accordance with the rotation angle of the casing from the reference point.

FIG. 9 is a diagram showing an example of a case where a background image of the three-dimensional display object 2 is changed in accordance with the rotation angle of the casing 10 from the reference point.

In the example shown in FIG. 9, the background image of the three-dimensional display object 2 is a sphere. It should be noted that in FIG. 9, the three-dimensional display object 2 is transparent for easy viewing of drawings.

In this case, the controller 14 determines the position of a virtual camera based on the rotation angle of the casing 10 from the reference point (see Step 108 of FIG. 3). Then, the controller 14 only has to control the display such that the background image (sphere) of the three-dimensional display object 2 is changed in accordance with the position of the virtual camera.

In this case, since the background image of the three-dimensional display object 2 is changed in accordance with the rotation angle, the feeling of rotating the three-dimensional display object 2 can be improved.

In the example described above, the front surface icon 2a is a music icon and the side surface icon 2b is a moving image icon. However, the combination of the front surface icon 2a and the side surface icon 2b is not limited to the example described above. For example, both the front surface icon 2a and the side surface icon 2b may be music icons or may be moving image icons. Alternatively, the front surface icon 2a may be a moving image icon and the side surface icon 2b may be a music icon. Alternatively, at least one of the front surface icon 2a and the side surface icon 2b may be an icon of a still image (photo or the like).

In those cases, the front surface icon 2a and the side surface icon 2b may have mutual association.

An example in which the front surface icon 2a and the side surface icon 2b are associated with each other will be described. For example, in the case where both the front surface icon 2a and the side surface icon 2b are music icons, the front surface icon 2a and the side surface icon 2b are music icons of a common artist or a common field (pops, jazz, etc.).

Further, for example, in the case where both the front surface icon 2a and the side surface icon 2b are moving image icons, the front surface icon 2a and the side surface icon 2b are moving image icons of a movie, a television program, or the like in a common series. Further, for example, in the case where the front surface icon 2a is a moving image icon and the side surface icon 2b is a music icon, the front surface icon 2a is a moving image icon of a movie or a television program, and the side surface icon 2b is an icon of music (sound track) used in the movie or the television program.

Examples in which the front surface icon 2a and the side surface icon 2b are mutually associated include a case where the side surface icon 2b is a context menu of the front surface icon 2a.

In the example described above, the side surface icon 2b is arranged on the right side surface of the three-dimensional display object 2, but it may be arranged on another surface such as a left side surface, a top surface, or a bottom surface of the three-dimensional display object 2.

In the example described above, the plurality of three-dimensional display objects 2 are displayed on the screen, but one three-dimensional display object 2 may be provided.

In the example described above, the three-dimensional display object 2 having a cubic shape has been described as an example of the three-dimensional display object 2. However, the shape of the three-dimensional display object 2 is not limited to the cubic shape. For example, the three-dimensional display object 2 may have a rectangular parallelepiped shape elongated in one direction.

The three-dimensional display object 2 may not be a hexahedron. Typically, the three-dimensional display object 2 may have any configuration as long as it is a polyhedron having surfaces more than those of a tetrahedron. It should be noted that the three-dimensional display object 2 may be a sphere as long as it is divided into multiple surfaces. It should be noted that also in those cases, a front surface icon 2a is arranged on a front surface (first surface) of the three-dimensional display object 2 having an optional shape, and another icon is arranged on a surface (second surface) other than the front surface.

In the example described above, the three-dimensional display object 2 is rotated about the y axis in accordance with the rotation angle of the casing 10 about the y axis. However, it is of course possible to structure the three-dimensional display object 2 so as to be rotated about the x axis in accordance with the rotation angle of the casing 10 about the x axis. It should be noted that a combination thereof is also possible. The direction in which the casing 10 is rotated is not particularly limited, which is also applied to embodiments to be described later.

Second Embodiment

Next, a second embodiment of the present disclosure will be described. It should be noted that in the description of the second embodiment and subsequent embodiments, members or the like having the same structures and functions as those in the first embodiment are simply described or not described, and different points from those of the first embodiment will mainly be described.

Figure 10:
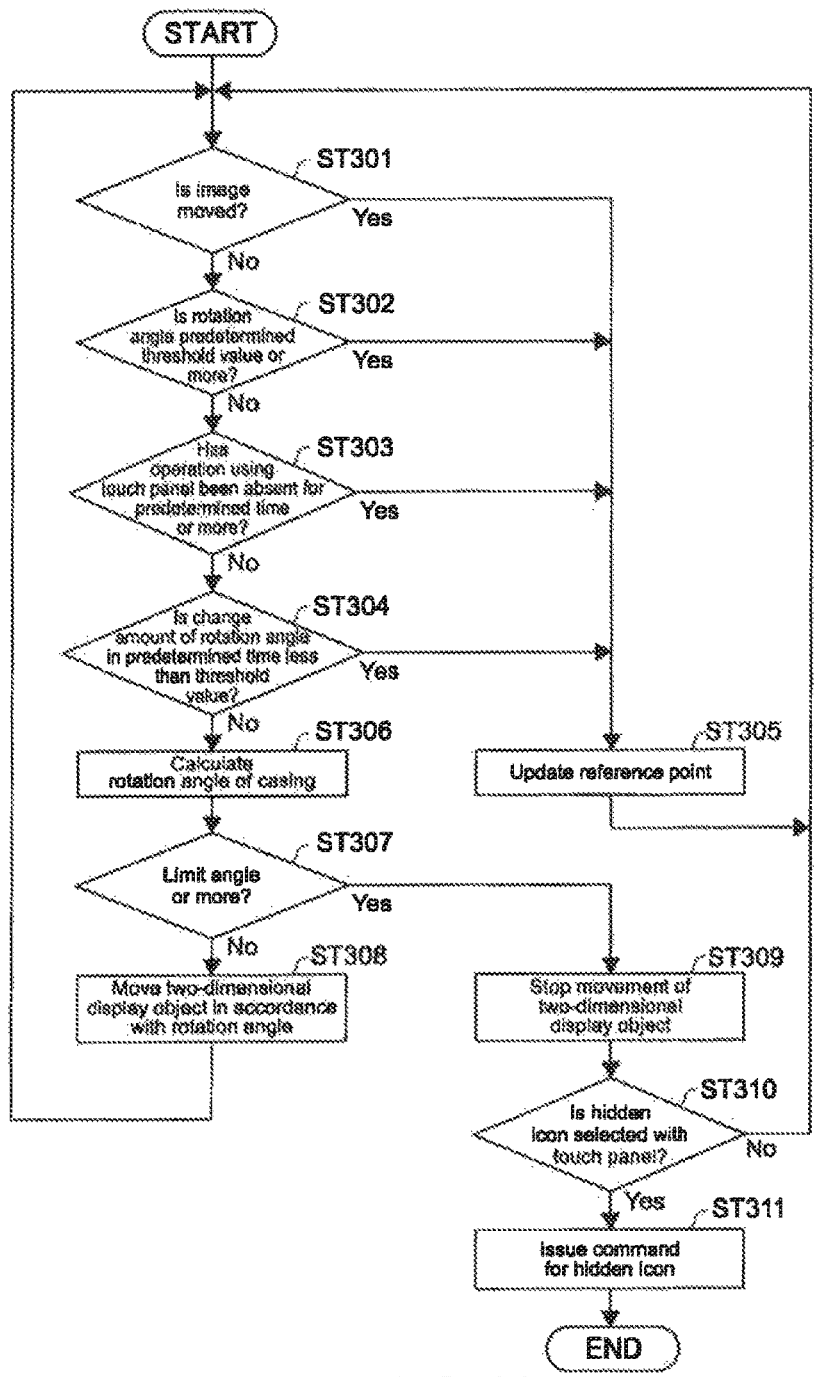
FIG. 10 is a flowchart showing processing of an information processing apparatus according to another embodiment of the present disclosure.
Figure 11:
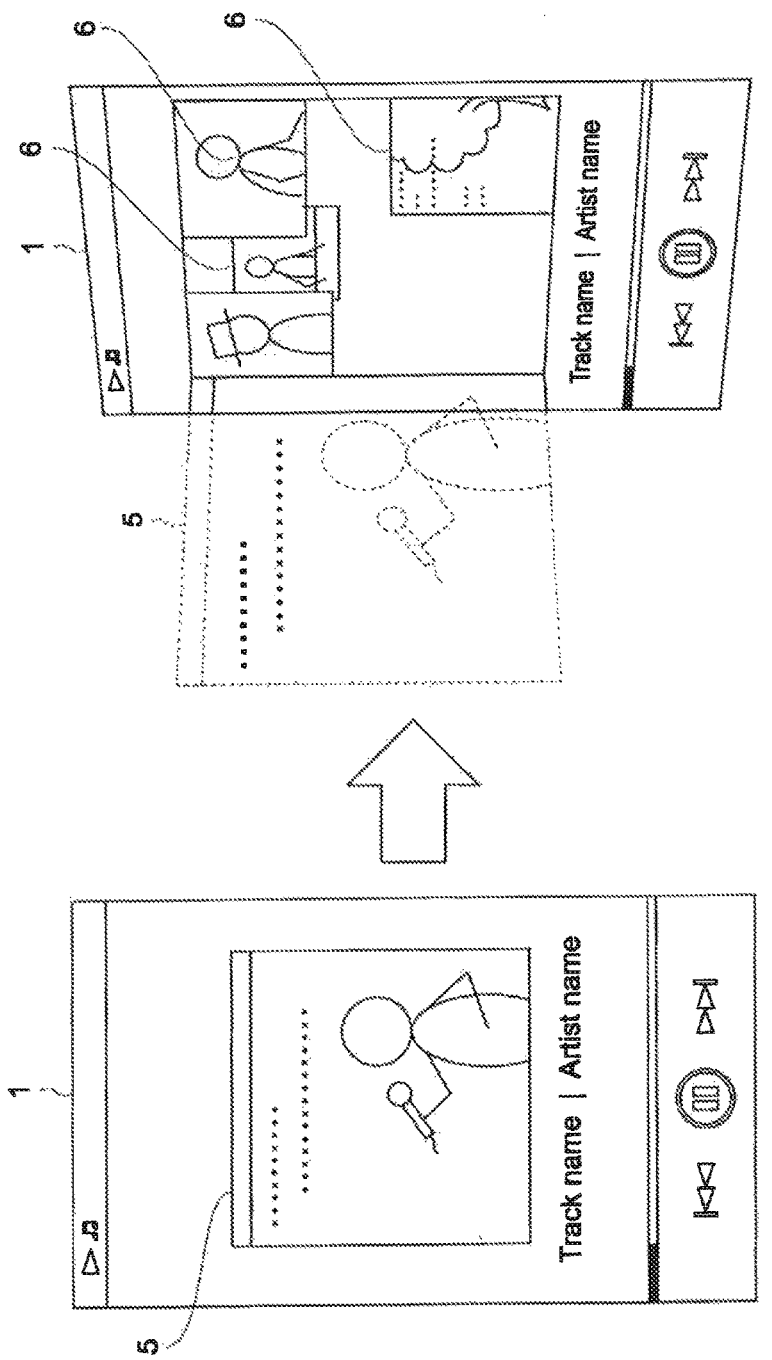
FIG. 11 is a diagram showing display states on a screen in the case where the processing shown in FIG. 10 is executed.

FIG. 10 is a flowchart showing processing of an information processing apparatus 100 according to the second embodiment. FIG. 11 is a diagram showing display states on a screen in the case where the processing shown in FIG. 10 is executed.

In Steps 301 to 305 shown in FIG. 10, the same processing as that in Steps 101 to 105 shown in FIG. 3 is executed.

In the case where the determination is positive in Steps 301 to 304 (YES of Steps 301 to 304), the controller 14 updates the reference point (Step 305). Upon update of the reference point, the rotation angle of the casing 10 at that time is a reference, and the rotation angle of the casing 10 is zero.

In the case where the rotation angle of the casing 10 is zero, the controller 14 displays a reference image on the screen. In the second embodiment, a reference image is an image shown in the left part of FIG. 11.

In the left part of FIG. 11, it is assumed that the reference image is a music reproduction image. A user performs touch and tap operations with a finger or the like at positions on a lower area of the screen 1, on which rewind, pause, and fast forward icons are displayed, to thereby control reproduction, stop, and the like of music.

At the center of the reference image, a two-dimensional display object (hereinafter, two-dimensional display object 5) moved on the screen in accordance with the rotation of the casing 10 is displayed. The two-dimensional display object 5 (first object) has an image of a jacket of a track to be reproduced.

In Step 306, the controller 14 calculates a rotation angle (about y axis) of the casing 10 from the reference point based on an output of the sensor 13. Next, the controller 14 determines whether the rotation angle of the casing 10 is a limit angle (for example, about 20 degrees to 45 degrees) or more (Step 307).

In the case where the rotation angle is less than a limit angle (NO of Step 307), the controller 14 controls the display such that the two-dimensional display object 5 is moved on the screen in accordance with the rotation angle (Step 308). It should be noted that in this case, the controller 14 controls the display such that the two-dimensional display object 5 is moved while being rotated (see broken line of right part of FIG. 11).

Accordingly, as shown in the right part of FIG. 11, a hidden icon 6 (second object) hidden behind the two-dimensional display object 5 gradually emerges on the screen as the rotation angle from the reference point increases.

Further, in this case, the controller 14 controls display such that the hidden icon is also moved on the screen in accordance with the rotation angle of the casing 10, similarly to the two-dimensional display object 5. In this case, the hidden icon 6 is moved in the opposite direction of the movement direction of the two-dimensional display object 5.

Figure 12:
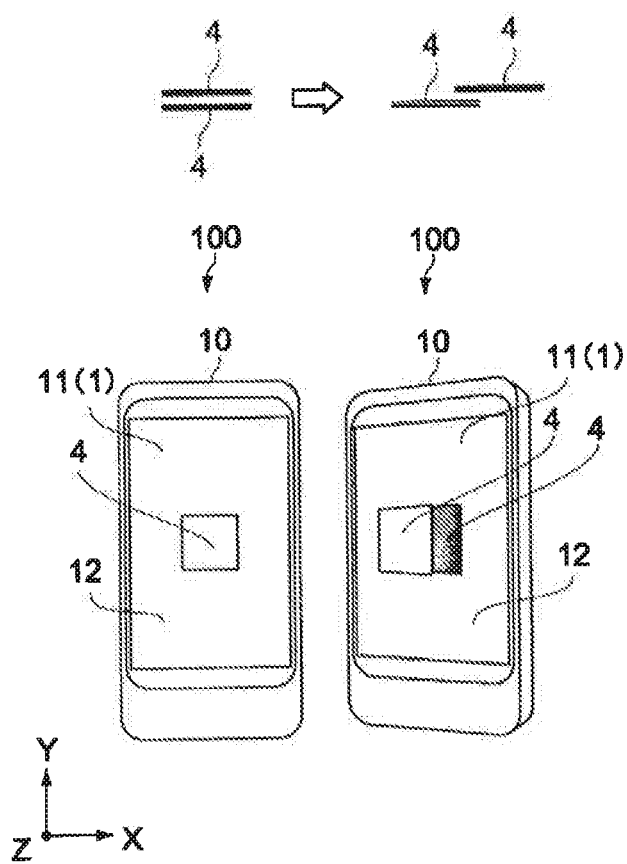
FIG. 12 is a diagram for explaining movement processing for a two-dimensional display object or a UI object such as a hidden icon.

FIG. 12 is a diagram for explaining movement processing for the two-dimensional display object 5 or the UI object 4 such as the hidden icon 6.

As shown in FIG. 12, two UI objects 4 are moved in parallel to each other and in the opposite directions in accordance with the rotation angle of the casing 10, and accordingly it is possible for the user to recognize a changed perspective.

The hidden icon 6 is typically an icon having association with a track to be reproduced in a reference image. For example, the hidden icon 6 is an icon of a track whose artist is the same for the track to be reproduced, or an icon of a track whose field (pops, jazz, etc.) is the same for the track to be reproduced. Alternatively, the hidden icon 6 may be an icon of a moving image or a still image, or the like associated with the track to be reproduced.

The controller 14 calculates movement amounts of the two-dimensional display object 5 and the hidden icon 6 in Step 308 based on the rotation angle of the casing 10. Then, the controller 14 only has to move the two-dimensional display object 5 and the hidden icon 6 on the screen based on the calculated movement amounts.

In the case where the rotation angle of the casing 10 is a limit angle or more (YES of Step 307), the controller 14 stops movement of the two-dimensional display object 5. In this case, the movement of the hidden icon 6 may be stopped or may not be stopped.

Next, the controller 14 determines whether the hidden icon 6 is selected with the touch panel 12 (Step 310). In the case where the hidden icon 6 is not selected (NO of Step 310), the controller 14 returns to Step 301. On the other hand, in the case where the hidden icon 6 is selected (YES of Step 310), a command for that hidden icon 6 is issued (Step 311).

[Action Etc.]

In the second embodiment, when the user rotates the casing 10, the two-dimensional display object 5 is moved on the screen in accordance with that rotation operation. Then, the hidden icon 6 hidden behind the two-dimensional display object emerges on the screen in accordance with the rotation operation, or hides behind the two-dimensional display object 5. Accordingly, the user can cause the hidden icon 6 to emerge on the screen or hide behind the two-dimensional display object 5 with the feeling of opening or closing a door (two-dimensional display object 5), at a time when the casing 10 is rotated.

Further, in this embodiment, the two-dimensional display object 5 is moved while being rotated at a time of the movement. Accordingly, the feeling of opening or closing a door (two-dimensional display object 5) further becomes instinctive.

Further, in this embodiment, the user can select an icon (hidden icon 6) without moving to another image when a track is reproduced. Accordingly, a load on the user can be relieved.

Modified Example of Second Embodiment

In the above description, the reference image is a music reproduction image, and the two-dimensional display object 5 is an image of a jacket of a track to be reproduced. However, the reference image may be a moving-image reproduction image. In this case, the two-dimensional display object 5 is a moving image to be reproduced in the moving-image reproduction image.

In this case, the hidden icon 6 is typically an icon having association with that moving image. For example, in the case where the moving image is a moving image of a movie or a television program, the hidden icon 6 is an icon of a moving image of another movie or television program, or the like in a common series. Alternatively, in this case, the hidden icon 6 may be an icon of music (sound track) used in another movie or television program, or the like in a common series.

Third Embodiment

Next, a third embodiment of the present disclosure will be described. It should be noted that in an information processing apparatus according to the third embodiment, a controller can simultaneously execute a plurality of application programs (multitask). Examples of the application programs include a mail program, a browsing program, a music reproduction program, a moving image reproduction program, and a telephone directory management program, but the application programs are not limited thereto.

Figure 13:
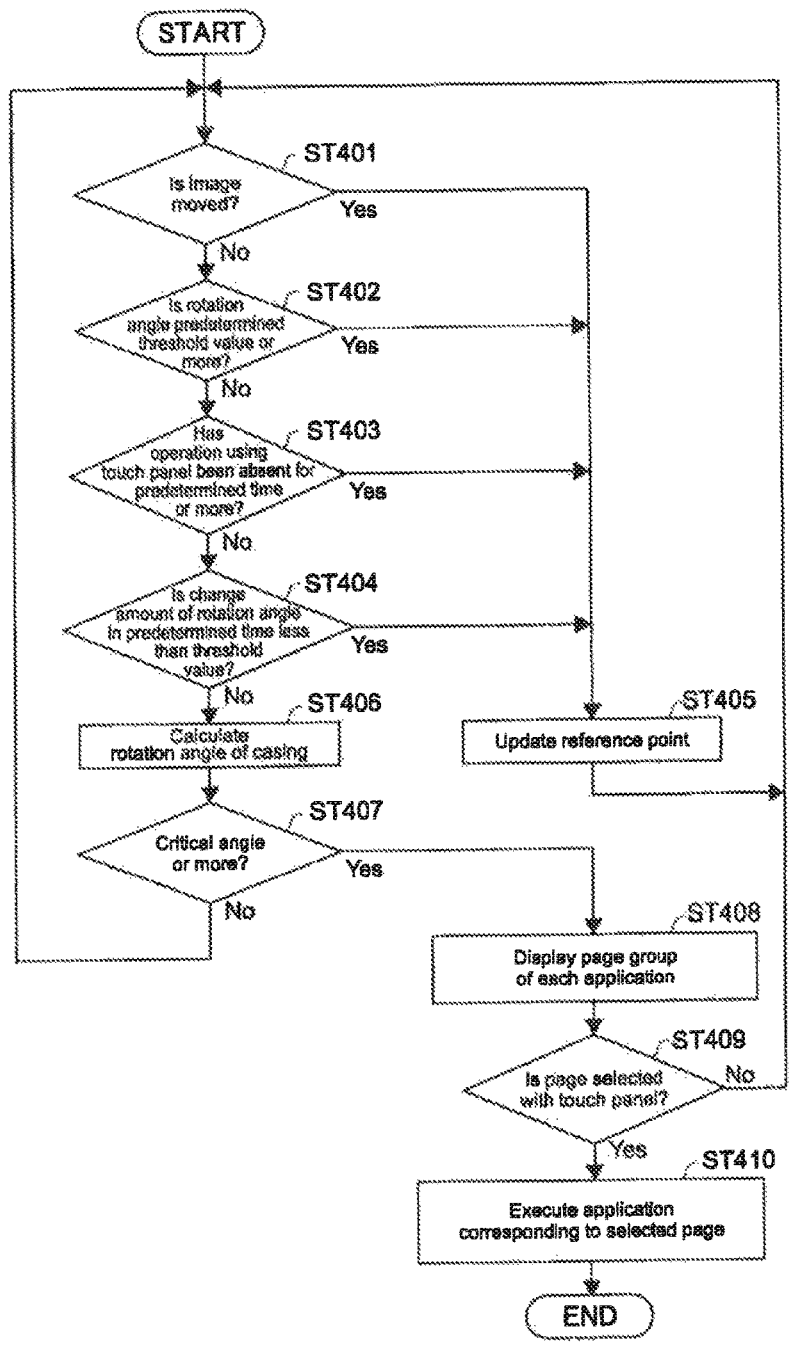
FIG. 13 is a flowchart showing processing of an information processing apparatus according to still another embodiment of the present disclosure.

FIG. 13 is a flowchart showing processing of an information processing apparatus 100 according to the third embodiment.

Figure 14:
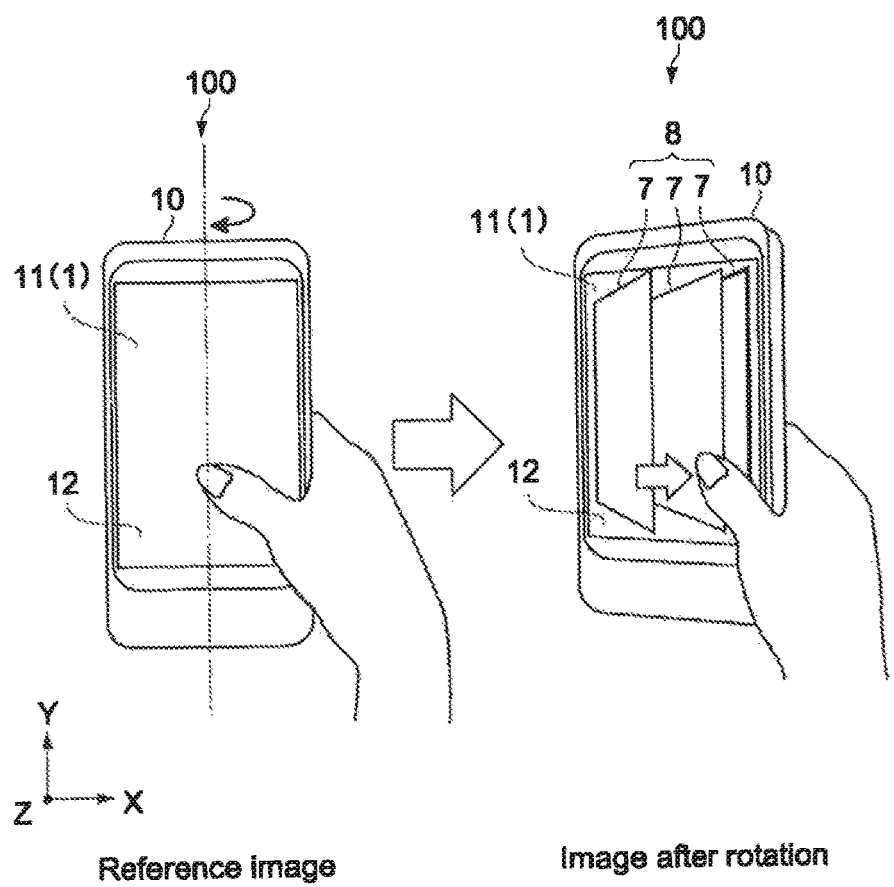
FIG. 14 is a diagram showing display states on a screen in the case where the processing shown in FIG. 13 is executed.

FIG. 14 is a diagram showing display states on a screen in the case where the processing shown in FIG. 13 is executed.

In Steps 401 to 405 shown in FIG. 13, the same processing as that in Steps 101 to 105 shown in FIG. 3 is executed.

In the case where the determination is positive in Steps 401 to 404 (YES of Steps 401 to 404), the controller 14 updates the reference point (Step 405). In this case, the reference image is displayed on the screen (see left part of FIG. 14). In the third embodiment, the reference image (first object) may have any configuration. The reference image is, for example, an image displayed by one of the plurality of application programs.

In Step 406, the controller 14 calculates a rotation angle (about y axis) of the casing 10 from the reference point based on an output from the sensor 13. Next, the controller 14 determines whether the rotation angle of the casing 10 is less than a critical angle (for example, about 20 degrees to 45 degrees).

In the case where the rotation angle is less than a critical angle (NO of Step 407), the controller 14 returns to Step 401. In the third embodiment, unlike the embodiments described above, the display on the screen is not changed when the rotation angle is less than a critical angle, and the display remains in the reference image.

On the other hand, in the case where the rotation angle is a critical angle or more (YES of Step 407), the controller 14 displays an image for selecting one application program from the plurality of application programs (second object) (Step 408) (see right part of FIG. 14). This image includes a page group 8 of application programs.

Pages 7 included in the page group 8 correspond to application programs such as a mail program, a browsing program, a music reproduction program, a moving image reproduction program, and a telephone directory management program. The pages 7 may include images of windows currently being opened.

Upon display of the page group 8, the controller 14 determines whether a page 7 is selected with the touch panel 12 (Step 409). Methods of selecting a page 7 include a method performed by a user sliding a finger on the touch panel 12 to move the focus and selecting an optional page by releasing the finger. It should be noted that any selection method for the pages 7 may be used.

When determining that a page 7 is selected with the touch panel 12 (YES of Step 409), the controller 14 executes an application corresponding to the selected page 7 (Step 410).

In the third embodiment, the user can rotate the casing 10 to cause the page group 8 of the application programs to emerge on the screen, and select an optional application program. Accordingly, the user does not need to repeat screen moving or the like in order to execute another application. Accordingly, a load on the user can be relieved.

Fourth Embodiment

Next, a fourth embodiment of the present disclosure will be described.

In the fourth embodiment, in the case where the casing 10 is rotated by a critical angle or more, a mail delete icon 9 is displayed on the screen.

Figure 15:
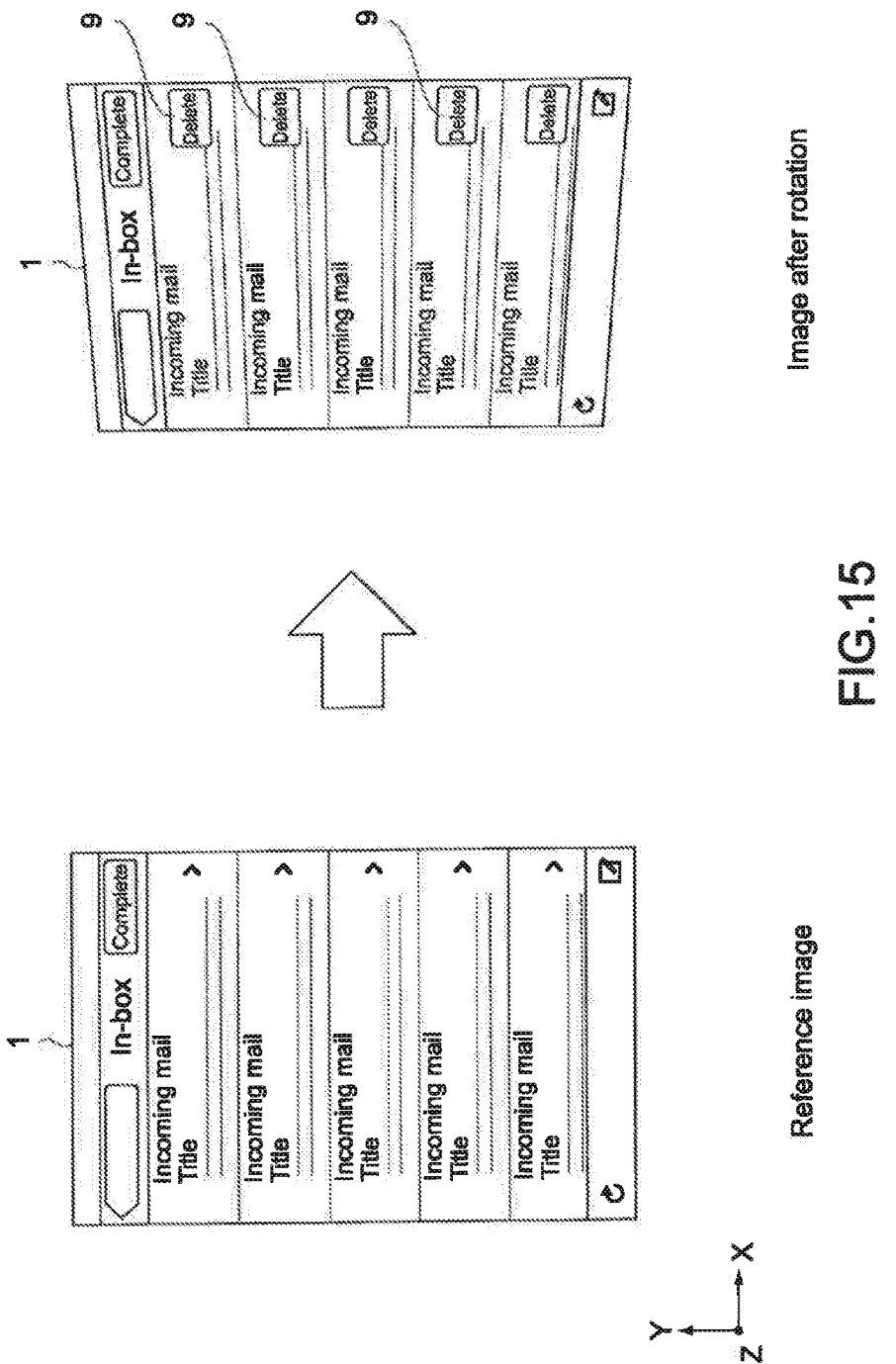
FIG. 15 is a diagram showing an example of a case where when the casing is rotated by a critical angle or more, a mail delete icon is displayed on a screen.

FIG. 15 is a diagram showing an example of a case where when the casing 10 is rotated by a critical angle or more, the mail delete icon 9 is displayed on a screen.

In the fourth embodiment, it is assumed a case where the reference image is an image, of an in-box (first object) (see left part of FIG. 15).

The controller 14 determines whether the rotation angle (about y axis) of the casing 10 from the reference point is a critical angle (about 20 degrees to 45 degrees) or more. In the case where the rotation angle is less than a critical angle, the mail delete icon 9 (second object) is not displayed on the screen (see left part of FIG. 15). On the other hand, in the case where the rotation angle is a critical angle or more, the controller 14 displays the mail delete icon 9 on the screen. Upon display of the mail delete icon 9, the mail delete icon 9 enters a selectable state. When detecting an input made by the user via the touch panel 12, the controller 14 executes a command of a mail delete icon 9 displayed at a position corresponding to the contact position, an deletes a mail corresponding thereto.

Here, there is a case where an icon for deleting contents such as the mail, delete icon 9 is mistakenly selected and it irreversible. On the other hand, in the information processing apparatus 100 according to the fourth embodiment, an icon 9 for deleting contents is displayed on the screen for the first time when the casing 10 is rotated by a critical angle or more, and enters an operable state. Accordingly, it is possible to prevent the user from mistakenly deleting content when the user does not intend to delete content.

It should be noted that in the above description, the mail delete icon 9 emerges on the screen for the first time when the casing 10 is rotated by a critical angle or more, but the configuration is not limited thereto. For example, a configuration in which the mail delete icon 9 emerges on the screen while rotating in accordance with the rotation angle (for example, one rotation) is also conceived. Alternatively, there is conceived a case where the mail delete icon 9 emerges on the screen while the color thereof gradually becomes dark in accordance with the rotation angle.

In the above description, the mail delete icon 9 is described as an icon for deleting contents, but icons for deleting contents may be icons for deleting music contents, moving image contents, still image contents, or the like.

Fifth Embodiment

Next, a fifth embodiment of the present disclosure will be described. In the fifth embodiment, in the case where the casing 10 is rotated by a critical angle or more, an icon 21 for operating a reproduction position of content such as music content is displayed.

Figure 16:
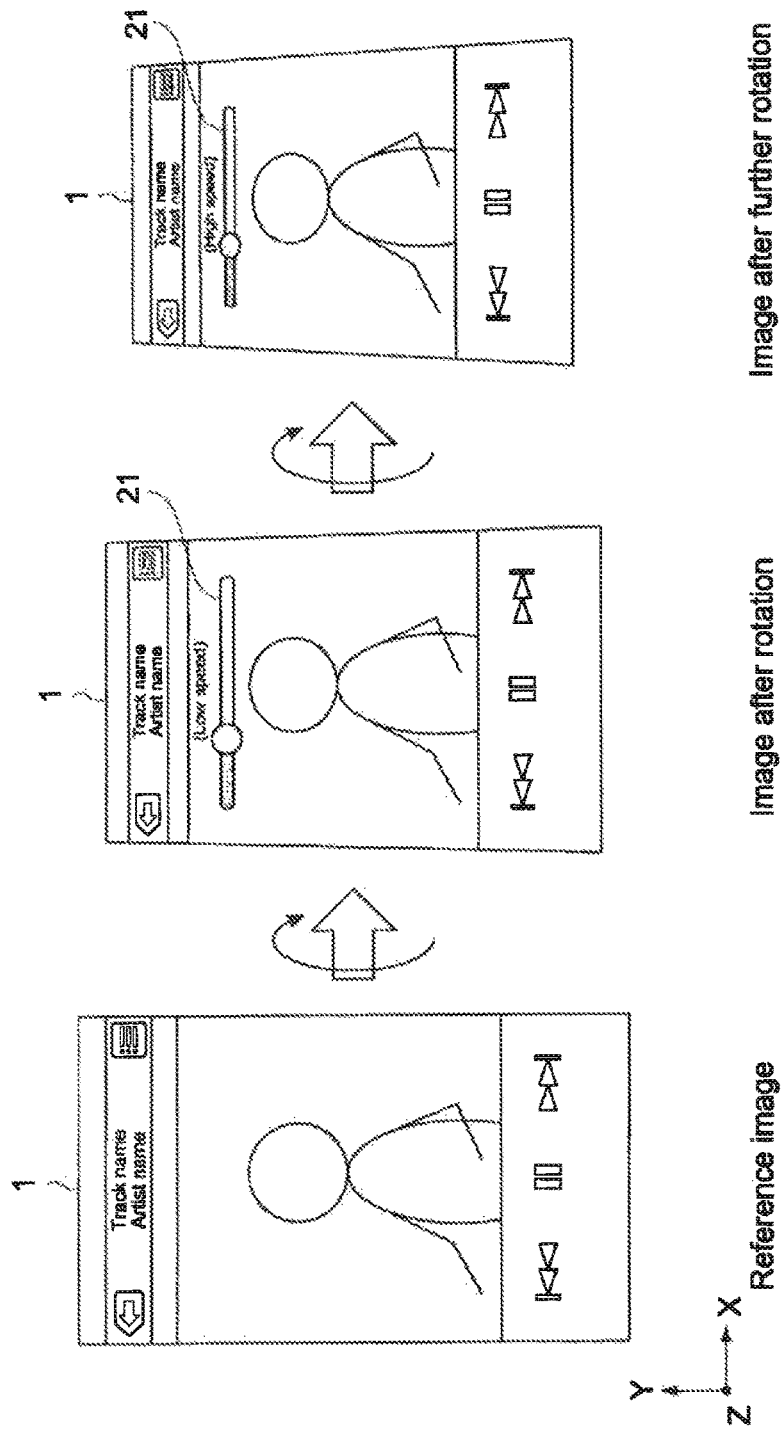
FIG. 16 is a diagram showing an example of a case where when the casing is rotated by a critical angle or more, an icon for operating a reproduction position of content such as music content is displayed.

FIG. 16 is a diagram showing an example of a case where when the casing 10 is rotated by a critical angle or more, an icon 21 for operating a reproduction position of content such as music content (hereinafter, reproduction position control icon 21) is displayed.

In the fifth embodiment, it is assumed that the reference image is a music reproduction image (first object) (see left part of FIG. 16). A user performs touch and tap operations with a finger or the like at positions on a lower area of the screen 1, on which rewind, pause, and fast forward icons are displayed, to thereby control reproduction, stop, and the like of music.

The controller 14 determines whether the rotation angle (about x axis) of the casing 10 from the reference point is a critical angle (about 20 degrees to 45 degrees) or more. In the case where the rotation angle is a critical angle or more, the controller 14 displays a reproduction position control icon 21 (second object) at an upper portion of the screen 1 (see center and right part of FIG. 16). Upon display of the reproduction position control icon 21 on the screen, the reproduction position control icon 21 enters an operable state. In the case where the reproduction position control icon 21 is operated with the touch panel 12, the controller 14 changes a reproduction position of a track in accordance with a change amount of a contact position on the touch panel 12. The user touches a position at which the reproduction position control icon 21 is displayed and slides a finger in a lateral direction, thus optionally selecting a reproduction position of the track.

Further, in the case where the rotation angle is a critical angle or more, the controller 14 changes a ratio of the change amount of the reproduction position of the track to the change amount of the contact position on the touch panel 12, in accordance with the rotation angle (see center and right part of FIG. 16). For example, in the case where the rotation angle is small, the controller 14 reduces the ratio (center of FIG. 16), and in the case where the rotation angle is large, the controller 14 increases the ratio (right part of FIG. 16). Accordingly, even in the case where the user slides a finger on the touch panel 12 in a lateral direction at the same speed, the change amount of the reproduction position becomes small (low speed) in the center of FIG. 16, and the change amount of the reproduction position becomes large (high speed) in the right part of FIG. 16.

In the example shown in FIG. 16, by rotating the casing 10, the user can optionally changing the ratio (speed) of the change amount of the reproduction position of the track to the change amount of the contact position on the touch panel 12.

In the above description, the reproduction position control icon 21 is described as an icon for operating a reproduction position of music contents, but the reproduction position control icon 21 may be an icon for operating a reproduction position of moving image contents.

Sixth Embodiment

Next, a sixth embodiment of the present disclosure will be described.

The sixth embodiment is different from the embodiments described above in that when the user rotates the casing 10 with a finger or the like in contact with the touch panel 12, the display or the like on the screen is changed. Therefore, that point will mainly be described.

Figure 17:
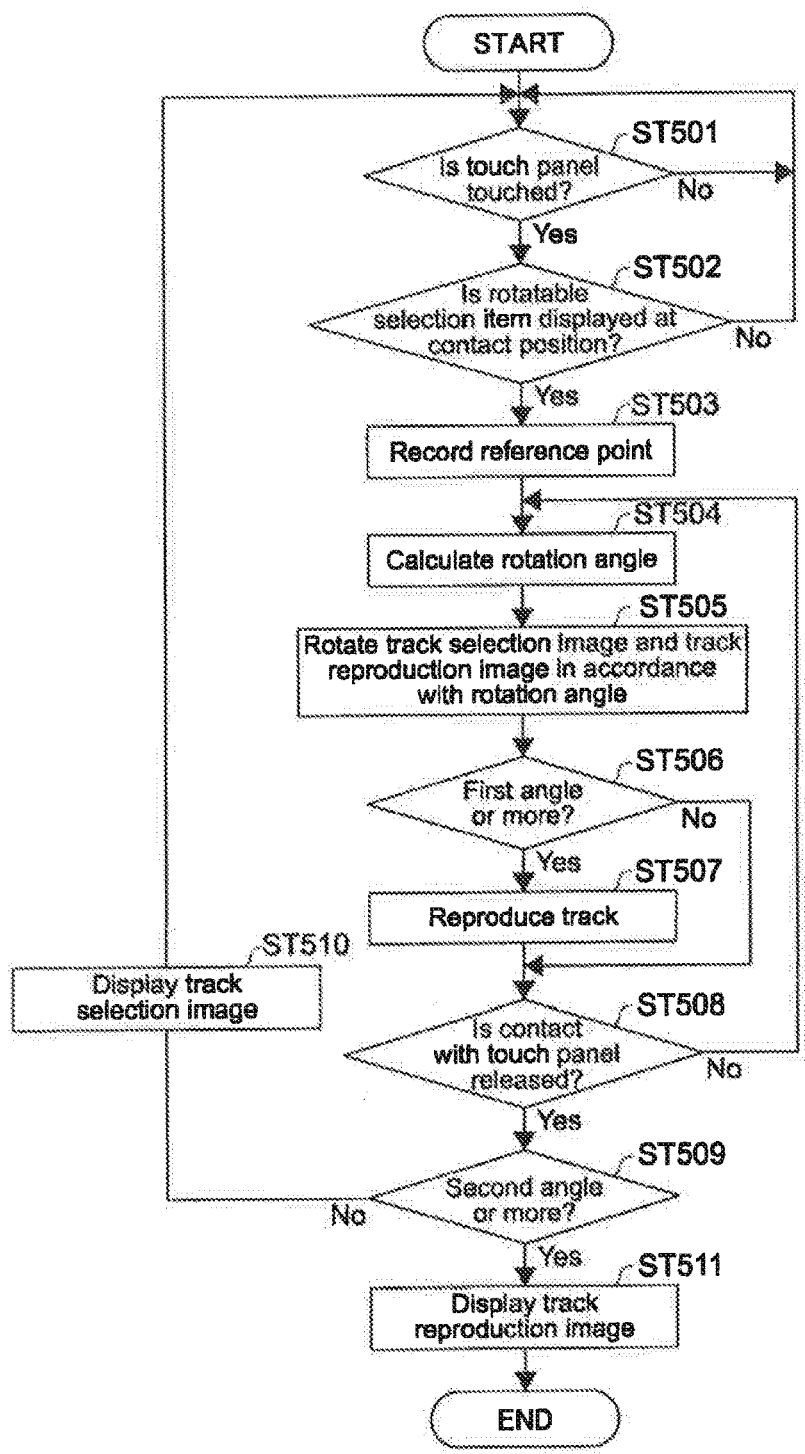
FIG. 17 is a flowchart showing processing of an information processing apparatus according to still another embodiment of the present disclosure.
Figure 18:
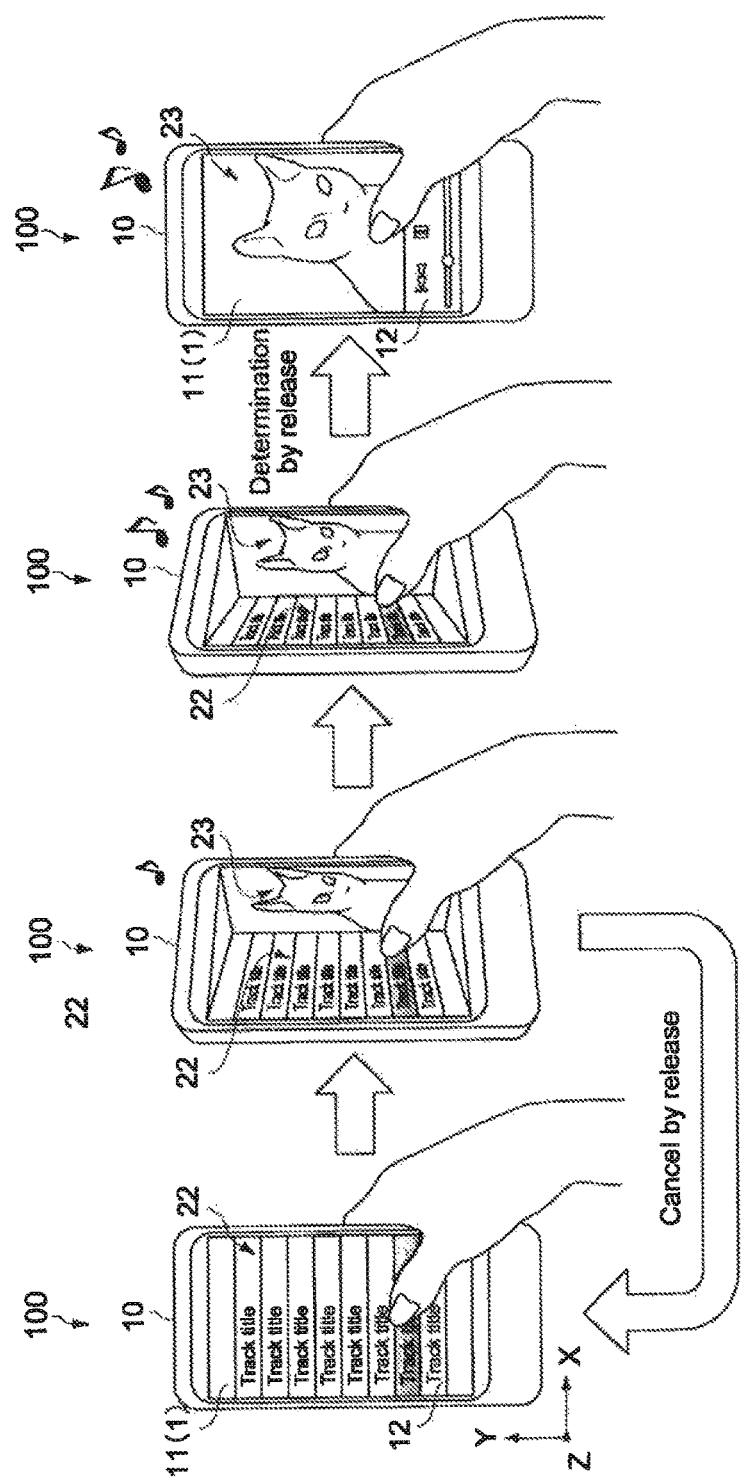
FIG. 18 is a diagram showing display states on a screen in the case where the processing shown in FIG. 17 is executed.

FIG. 17 is a flowchart showing processing of an information processing apparatus 100 according to the sixth embodiment. FIG. 18 is a diagram showing display states on a screen in the case where the processing shown in FIG. 17 is executed.

The controller 14 determines whether contact of a user's finger or the like is detected with the touch panel 12 (Step 501). In the case where contact is not detected, the controller 14 returns to Step 501 and determines whether contact of a user's finger or the like is detected with the touch panel 12 again.

In the case where contact is not detected, the display states or the like on the screen are not changed and an image as shown in the left end part of FIG. 18 is displayed on the screen.

In the left end part of FIG. 18, a track selection image 22 (first image) including a plurality of track titles (selection items) is displayed. It should be noted that a state where an image (first image) including selection items such as track titles is displayed on the entire screen will be hereinafter referred to as a first display mode.

In the case where contact is detected with the touch panel 12 (YES of Step 501), the controller 14 proceeds to the nest. Step 502. In Step 502, the controller 14 determines whether a rotatable selection item such as a track title is displayed at a position of on the screen that corresponds to the contact position of the touch panel 12.

In the case where a rotatable selection item (track title) is not displayed at the contact position (NO of Step 502), the controller 14 returns to Step 501.

On the other hand, in the case where a rotatable selection item (track title) is displayed on the contact position (YES of Step 502), a position of the casing 10 at a time when contact is detected is recorded as a reference point (Step 503).

Next, the controller 14 calculates a rotation angle (about y axis) of the casing 10 from the reference point based on an output from the sensor 13 (motion sensor) (Step 504).

Upon calculation of the rotation angle of the casing 10, the track selection image 22 is displayed in a rotational manner in accordance with the calculated rotation angle (Step 505) (see center left part and center right part of FIG. 18). Further, in this case, the controller 14 displays a track reproduction image 23 (second image) in a rotational manner in accordance with the calculated rotation angle (see center left part and center right part of FIG. 18). The track reproduction image 23 is a track reproduction image 23 of a track selected on the track selection image 22, and has an image of a jacket or the like of the track (see right end part of FIG. 18).

In Step 505, the controller 14 calculates rotation angles of the track selection image 22 and the track reproduction image 23 (UI objects 4) based on the rotation angle of the casing 10, and displays the respective images in a rotational manner about the respective axes (see FIG. 6). The track selection image 22 is displayed in a rotational manner with a left end of the screen 1 as a center axis of the rotation. On the other hand, the track reproduction image 23 is displayed in a rotational manner with a right end of the screen 1 as a center axis of the rotation.

It should be noted that in the following description, a state where the UI objects 4 such as the track selection image 22 and the track reproduction irises 23 are displayed in a rotational manner in accordance with the rotation angle of the casing 10 (may be displayed with movement) is referred to as a second display mode. In the second display mode, as the rotation angle of the casing 10 becomes large, the track reproduction image 23 gradually emerges on the screen and the track selection image 22 gradually disappears from the screen.

Upon display of the track selection image 22 and the track reproduction image 23 in a rotational manner, the controller 14 then determines whether the rotation angle of the casing 10 is a first angle (about 0 degrees to 10 degrees) or more (Step 506). In the case where the rotation angle of the casing 10 is a first angle or more (YES of Step 506), the controller 14 reproduces the selected track (Step 507), and proceeds to Step 508. On the other hand, in the case where the rotation angle of the casing 10 is less than a first angle (NO of Step 506), the controller 14 does not reproduce the track and proceeds to the next Step 508.

In Step 508, the controller 14 determines whether contact with the touch panel 12 is released based on the output from the touch panel 12. In the case where concert with the touch panel 12 is not released (NO of Step 508), the controller 14 calculates a rotation angle of the casing 10 again (Step 504) and displays the respective images 22 and 23 in a rotational manner in accordance with the calculated rotation angle (Step 505). In other words, during a period of time from the detection of the contact with the touch panel 12 to the release of the contact with the touch panel 12, the controller 14 displays the respective images 22 and 23 in a rotational manner based on the rotation angle of the casing 10.

On the other hand, in the case where contact with the touch panel 12 is released (YES of Step 508), the controller 14 determines whether the rotation angle of the casing 10 at a time when contact is released is a second angle (about 20 degrees to 45 degrees) or more (Step 509).

In the case where the rotation angle of the casing 10 at a time when contact is released is less than a second angle (NO of Step 509), the controller 14 displays the track selection image 22 on the screen (Step 510) (center left part of FIG. 18 to left end part of FIG. 18) (second display mode to first display mode). In other words, in the case where the rotation angle of the casing 10 at a time when contact is released is less than a second angle, the selection and determination of a track selected on the track selection image 22 is cancelled and the track selection image 22 is displayed on the screen again. Upon display of the track selection image 22 on the screen, the controller 14 returns to Step 501 again and determines whether the touch panel 12 is touched.

On the other hand, in the case where the rotation angle of the casing 10 at a time when contact is released is a second angle or more (YES of Step 509), the controller 14 displays the track reproduction image 23 on the screen (Step 511) (center right part of FIG. 18 to right end part of FIG. 10 (second display mode to third display mode). In other words, in the case where the rotation angle of the casing 10 at a time when contact is released is a second angle or more, a track selected on the track selection image 22 is determined and a track reproduction image 23 of the track is displayed on the screen. It should be noted that a state where the track reproduction image 23 (image after selection and determination) is displayed on the entire screen 1 will be hereinafter referred to as a third display mode.

In the state where the track reproduction image 23 is displayed (third display mode), a user performs touch and tap operations with a finger or the lie at positions on a lower area of the screen 1, on which rewind, pause, and fast forward icons are displayed, to thereby control reproduction, stop, and the like of music. It should be noted that in this embodiment, at a time when the second display mode is switched to the third display mode (center right part of FIG. 18 to right end part of FIG. 18), the reproduction of the track has been started (see Step 507).

[Action Etc.]

Through the processing shown in FIG. 17, the user touches with a finger an area of the track selection image 22 where an optional selection item (track title) is displayed, and rotates the casing 10 with the finger being in contact with the area, and accordingly a track reproduction image 23 of the track can be gradually caused to emerge on the screen. The user visually recognizes the track reproduction image 23 (including image of a jacket or the like of the track), and accordingly can grasp details or the like of the track. It should be noted that in this embodiment, in the case where the rotation angle of the casing 10 is the first angle or more, the track is started to be reproduced, with the result that details of the track selected on the track selection image 22 can be grasped more easily.

Further, if the user releases the finger from the touch panel 12 in a state where the rotation angle of the casing 10 is less than the second angle, it is possible to cancel the selection item (track title) selected on the track selection image 22 and display the track selection image 22 again on the screen (center left part of FIG. 18 to center right part of FIG. 18). Accordingly, in the case where the track selected on the track selection image 22 is not a desired track, the user can release the finger from the touch panel 12 to display the track selection image 22 again on the screen, and look for a desired track quickly.

On the other hand, in the case where a track selected on the selection image is a desired track, the user rotates the casing 10 to a large degree (second angle or more) and releases the finger from the touch panel 12, to thereby select and determine the track and cause the track reproduction image 23 to be displayed on the screen (center right part of FIG. 18 to right end part of FIG. 18).

Modified Example of Sixth Embodiment

In the case where a specific position of the track reproduction image 23 is touched in the third display mode (right end part of FIG. 18), the third display mode may be switched, to the second display mode (center left part and center right part of FIG. 18).

In the above description, in the second display mode, the track selection image 22 and the track reproduction image 23 are displayed in a rotational manner in accordance with the rotation angle. However, the track selection image 22 and the track reproduction image 23 may be moved in parallel to each other and in the opposite directions in accordance with the rotation angle in the second display mode (see FIG. 12). Alternatively, there is conceived a case where as the rotation angle becomes large, the color of the track selection image 22 becomes light and the color of the track reproduction image 23 becomes dark.

In the above description, in the second display mode, the track selection image 22 and the track reproduction image 23 are displayed in a rotational manner in accordance with the rotation angle of the casing 10 about the y axis, with an axis of the y-axis direction as a center axis. On the other hand, the track selection image 22 and the track reproduction image 23 can be configured to be displayed in a rotational manner in accordance with the rotation angle of the casing 10 about the x axis, with the axis of an x-axis direction as a center axis. Alternatively, a combination of the above is also possible. In this case, an image after selection and determination (second image) can be differentiated in accordance with a rotation direction.

In the above description, the first image (image including selection items) is a track selection image 22 and the second image (image after selection and determination) is a track reproduction image 23. However, the combination of the first image and the second image is not limited to the above. For example, the first image may be a moving-image selection image, and the second image may be a moving-image reproduction image. In this case, the reproduction of the moving image may be started in the case of a first angle or more of the casing 10. Alternatively, examples of the combination of the first image and the second image include a case where the first image is a selection image of an application program and the second image is an image of a window displayed by the application program. Typically, if the first image is an image including selection items and the second image is an image obtained after the selection item is selected and determined, the embodiment of the present disclosure can be applied to any cases.

Seventh Embodiment

Next, a seventh embodiment of the present disclosure will be described.

Figure 19:
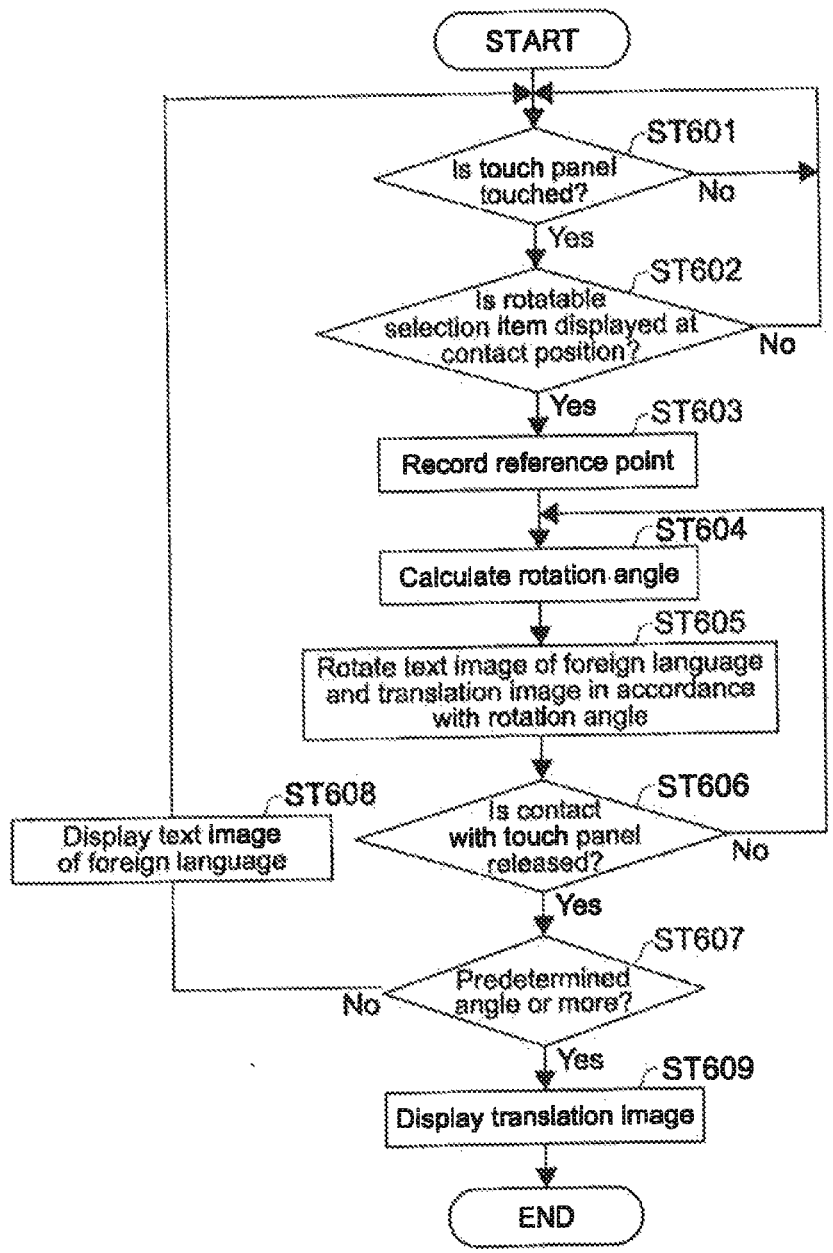
FIG. 19 is a flowchart showing processing of an information processing apparatus according to still another embodiment of the present disclosure.
Figure 20:
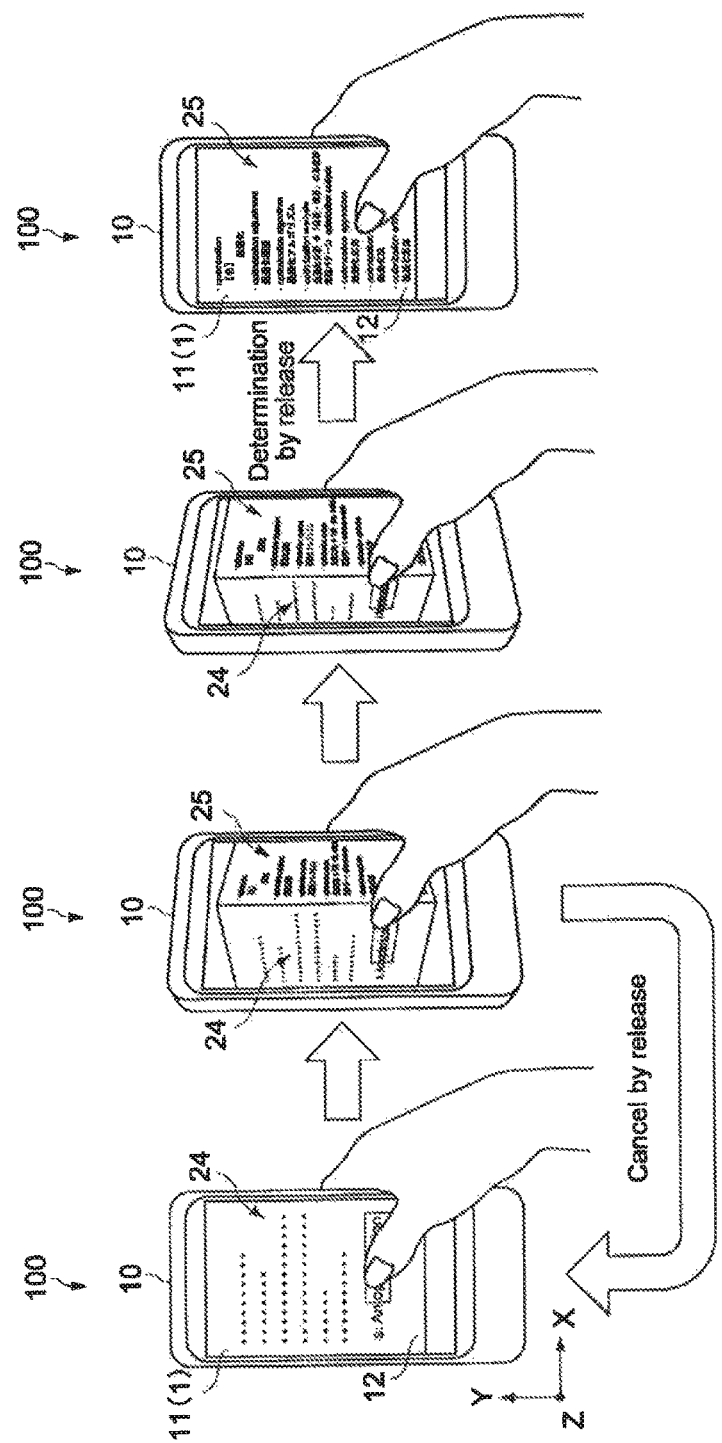
FIG. 20 is a diagram showing display states on a screen in the case where the processing shown in FIG. 19 is executed.

FIG. 19 is a flowchart showing processing of an information processing apparatus 100 according to the seventh embodiment. FIG. 20 is a diagram showing display states on a screen in the case where the processing shown in FIG. 19 is executed.

As shown in FIG. 20, in the seventh embodiment, a first image is assumed to be a text image 24 of foreign language such as English (image including selection items of character information) (see left end part of FIG. 20). The text image 24 of foreign language includes selection items (selection items of character information) such as words and idioms.

Further, in the seventh embodiment, a second image is assumed to be a translation image 25 of a selected word, idiom, or the like (image including information relating to character information) (see right end part of FIG. 20).

It should be noted that in FIG. 20, a case is assumed where a word of "optimization" is selected as a selection item, and a translation image 25 of "optimization" emerges as a second image on the screen in accordance with the rotation angle.

The controller 14 determines whether the touch panel 12 is touched (Step 601), and if contact is detected (YES of Step 601), the controller 14 determines whether a selection item such as a word is displayed at a contact position of the touch panel 12 (Step 602).

In the case where a selection item such as a word is selected (YES of Step 602), a position of the casing 10 at that time is recorded as a reference point (Step 603), and the rotation angle of the casing 10 is calculated (Step 604). Next, the controller 14 displays the test image 24 of foreign language and the translation image 25 in a rotational manner in accordance with the rotation angle of the casing 10 (Step 605).

During a period of time from the detection of the contact with the touch panel 12 to the release of the contact, the controller 14 displays the text image 24 of foreign language and the translation image 25 in a rotational manner in accordance with the rotation angle of the casing 10 (loop of NO in Steps 604 to 606) (center left part and center right part of FIG. 20) (second display mode).

In the case where contact with the touch panel 12 is released (YES of Step 606), the controller 14 determines whether the rotation angle of the casing 10 at a time when contact is released is a predetermined angle (for example, about 20 degrees to 45 degrees) or more (Step 607). In the case where the rotation angle is less than the above-mentioned degree, the controller 14 displays the text image 24 of foreign language on the screen (Step 608) (center left, part of FIG. 20 to left end part of FIG. 20) (second display mode to first display mode). On the other hand, in the case of the above-mentioned angle or more, the controller 14 displays the translation image 25 on the screen (Step 609) (center right part of FIG. 20 to right end part of FIG. 20) (second display mode to third display mode).

In the seventh embodiment, the user touches with a finger an area of the text image 24 of foreign language, in which a word that the user does not know is displayed, and rotates the casing 10 with the finger being in contact with the area. Accordingly, the user can cause a translation image 25 of the word to emerge on the screen. The user visually recognizes the translation image 25, and accordingly can check the meaning of the word. When the check is ended, the user only has to release the finger from the touch panel 12 in a state where the rotation angle of the casing 10 is smaller than the above-mentioned angle. Accordingly, the text image 24 of foreign language can be displayed again. On the other hand, in the case where the user intends to check the meaning of the word in details, the user only has to release the finger from the touch panel 12 in a state where the casing 10 is rotated to a large degree (by the above-mentioned angle or more). Accordingly, the translation image 25 is displayed on the screen and the meaning of the word can be checked in details.

In the case where a specific position of the translation image 25 is touched in the third display mode (right end part of FIG. 20), the third display mode may be switched to the second display mode.

In the above description, the first image is the text image 24 of foreign language, and the second image is the translation image 25. However, the first image can be a search image on the web (image including search word), and the second image can be an image of a search result (image including information on search word).

Eighth Embodiment

Next, an eighth embodiment of the present disclosure will be described.

Figure 21:
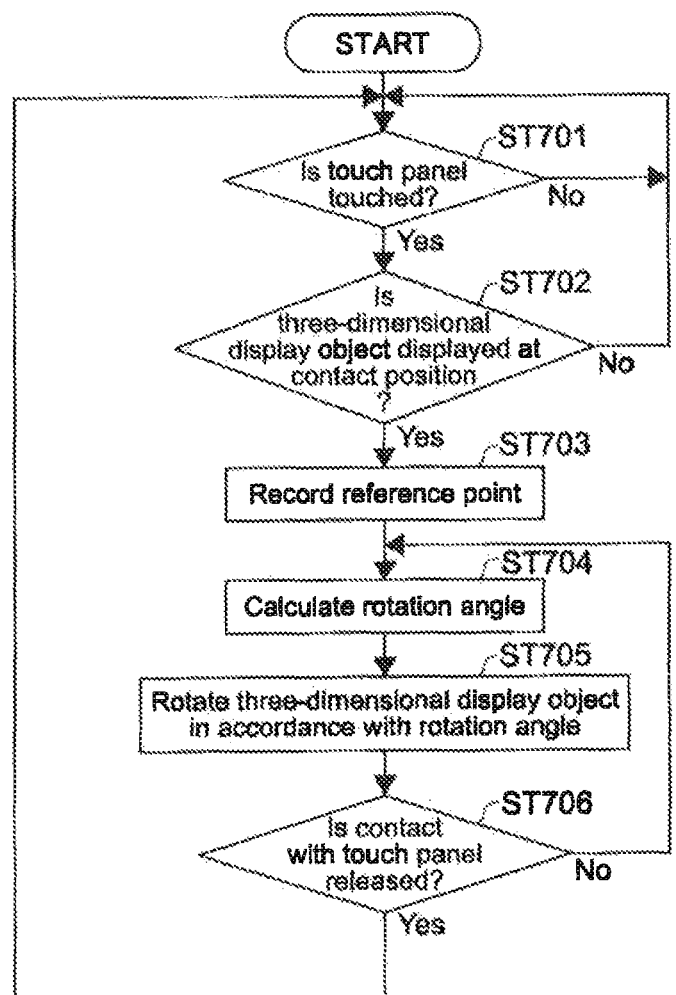
FIG. 21 is a flowchart showing processing of an information processing apparatus according to still another embodiment of the present disclosure.
Figure 22:
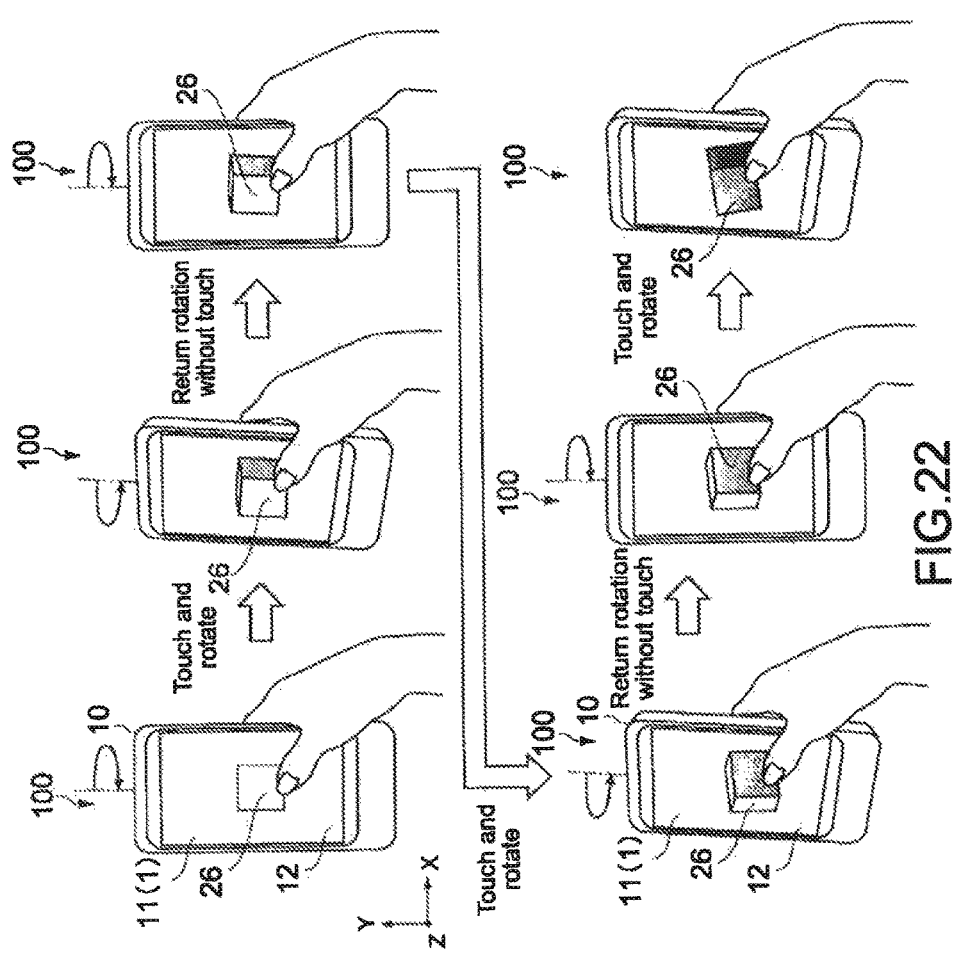
FIG. 22 is a diagram showing display states on a screen in the case where the processing shown in FIG. 21 is executed.

FIG. 21 is a flowchart showing processing of an information processing apparatus 100 according to an eighth embodiment. FIG. 22 is a diagram showing display states on a screen in the case where the processing shown in FIG. 21 is executed.

The controller 14 determines whether the touch panel 12 is touched (Step 701). In the case where contact is detected (YES of Step 701), the controller 14 determines whether a three-dimensional display object 26 is displayed at a position on the screen that corresponds to the contact position (Step 702).

In the case where a three-dimensional display object 26 is displayed (YES of Step 702), the controller 14 records a position of the casing 10 at a time when contact is detected, as a reference point (Step 703). Next, the controller 14 calculates the rotation angle of the casing 10 after the detection of the contact (Step 704), and displays the three-dimensional display object 26 in a rotational manner in accordance with the rotation angle of the casing 10 (Step 705).

Outing a period of time from the detection of the contact with the touch panel 12 to the release of the contact, the controller 14 displays the three-dimensional display object 26 in a rotational manner in accordance with the rotation angle of the casing 10 (loop of NO in Steps 704 to 706).

In the case where contact with the touch panel 12 is released (YES of Step 706), the controller 14 returns to Step 701 again and determines whether contact with the touch panel 12 is detected.

Through the processing hone in FIG. 21, as shown in FIG. 22, the user repeats an operation of rotating the casing 10 while touching the touch panel 12 and an operation of rotating the casing 10 in the opposite direction without touching the touch panel 12, to thereby display a side surface, a rear surface, or the like of the three-dimensional display object 26.

It should be noted that in FIG. 22, an example is shown in which when the casing 10 is rotate about the y axis, the three-dimensional display object 26 is rotated about the y axis. However, when the casing 10 is rotated about the x axis, the three-dimensional display object 26 may be rotated about the x axis. It should be noted that the three-dimensional display object 26 may be displayed in a rotational manner about both the x axis and the y axis.

In FIG. 22, the three-dimensional display object 26 is a hexahedron. However, the shape of the three-dimensional display object 26 may be another polyhedron such as a tetrahedron, a sphere, or the like. The shape of the three-dimensional display object 25 is not particularly limited.

In the case where the three-dimensional display object 26 has a plurality of surfaces, icons may be assigned to the respective surfaces. In this case, a selectable icon is switched in accordance with the angle of the casing 10 (see first embodiment described above). Accordingly, the user rotates the casing 10 with the finger or the like being in contact with the touch panel 12 to rotate the three-dimensional display object 26, to thereby cause an optional, icon to be displayed on the screen for selection.

In the case where the three-dimensional display object 26 includes a plurality of icons, those icons may have mutual association.

It should be noted that when icons are assigned to respective surfaces, an optional icon is selected and determined in an operation such as a tap operation. Accordingly, when the user touches a display position of the three-dimensional display object 26 in order to rotate the three-dimensional display object 26, an icon can be prevented from being selected and determined by the user.

In the case where the user slides a finger or the like at a position or the screen on which the three-dimensional display object 26 is displayed, the three-dimensional display object 26 may be configured to be rotated.

Figure 23:
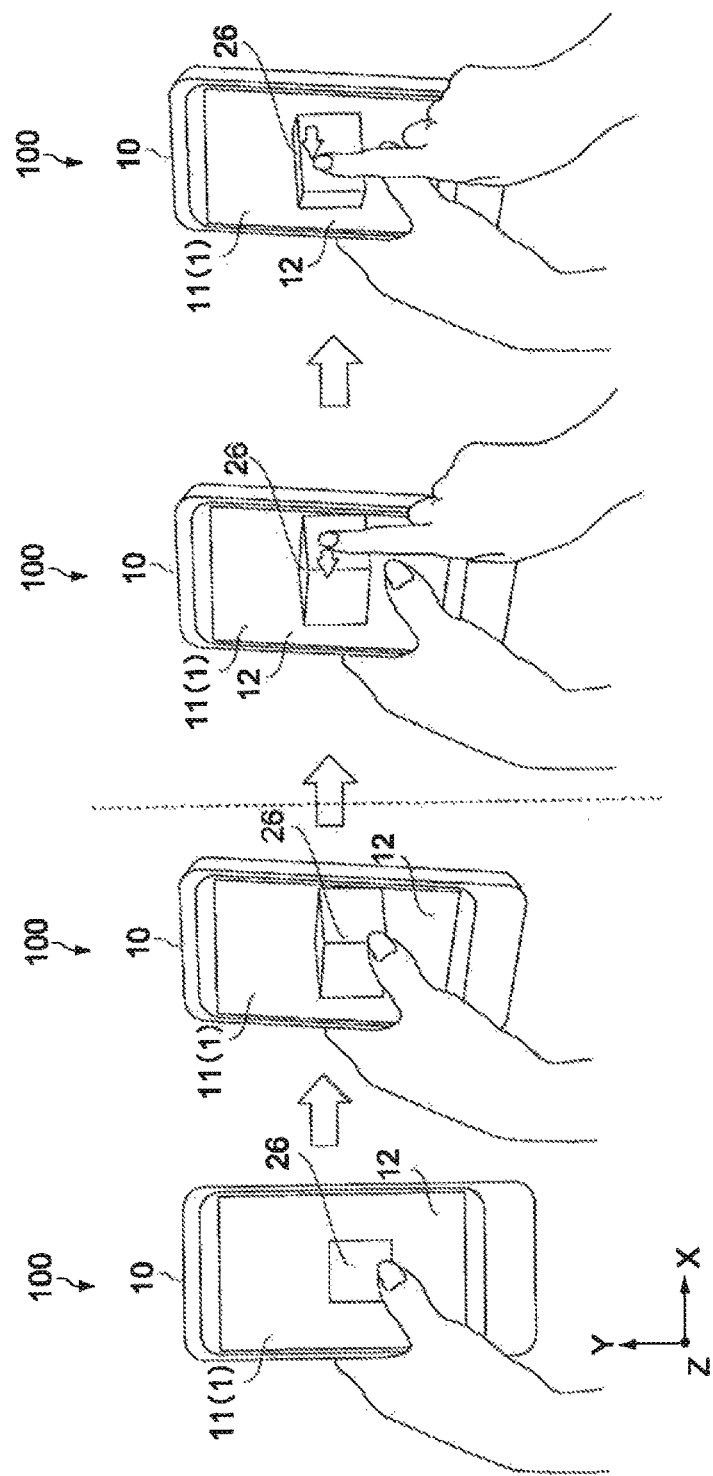
FIG. 23 is a diagram showing an example of a case where when the user slides a finger or the like at a position of the screen on which a three-dimensional display object is displayed, the three-dimensional display object is rotated.

FIG. 23 is a diagram showing an example of a case where when the user slides a finger or the like at a position of the screen on which the three-dimensional display object 26 is displayed, the three-dimensional display object 26 is rotated.

As shown in the left end part and the center left part of FIG. 23, the user touches with a finger or the like a position where the three-dimensional display object 26 is displayed, and rotates the casing 10 while maintaining this state. Then, the three-dimensional display object 26 is displayed in a rotational manner on the screen (Steps 701 to 706).

In addition, as shown in the center right part and the right end part of FIG. 23, when the user slides the finger or the like at a position of the screen on which the three-dimensional display object 26 is displayed, the three-dimensional display object 26 is rotated. In this case, the controller 14 only has to display the three-dimensional display object 26 in a rotational manner based on information of the change amount of the contact position from the touch panel 12. Accordingly, the user can rotate the three-dimensional display object 26 by rotating the casing 10 while touching the touch panel 12, or can rotate the three-dimensional display object 26 by sliding a finger at a position where the three-dimensional display object 26 is displayed. Accordingly, a surface such as a rear surface of the three-dimensional display object 26 can be displayed on the screen with ease.

In the description of FIG. 23, when the user rotates the casing 10 while touching a position at which the three-dimensional display object 26 is displayed, the three-dimensional display object 26 is displayed in a rotational manner, but the present disclosure is not limited thereto. The example shown in FIG. 22 can also be applied to a configuration in which the reference point is automatically updated, which has been described in the first embodiment to fifth embodiment.

Various Modified Examples

In the embodiments described above, the motion sensor has been exemplified as the sensor 13 that detects the inclination of the information processing apparatus. However, the sensor 13 that detects the inclination of the information processing apparatus is not limited to the motion sensor. For example, for the sensor 13, image sensors such as a COD (Charge Coupled Device sensor and a CMOS (Complementary Metal Oxide Semiconductor) sensor may be used. In this case, an image sensor is provided on the front side of the casing 10.

In this case, the controller 14 determines a position or an angle of the face of the user based on an image captured by the image sensor. The controller 14 can detect the inclination of the information processing apparatus with respect to the face of the user based on a change of the position of the face within the image or a change of the angle of the face.

It should be noted that in the case where the image sensor is used as the sensor 13 in the first to fifth embodiments, the reference point is obtained when the face of the user is positioned in front of the casing 10.

In recent years, there is a case where an image sensor 13 such as a CCD sensor 13 may be arranged on the front side of the casing 10 for the purpose of video chat or the like. The image sensor 13 may be effectively used as a sensor 13 for calculating the rotation angle. In this case, const reduction is achieved.

Alternatively, the sensor 13 may be a combination of a motion sensor and an image sensor. In this case, the position accuracy of a reference point, calculation accuracy of a rotation angle, or the like can be improved.

There is conceived a case where the information processing apparatus does not include a display and a display is separately provided.

Figure 24:
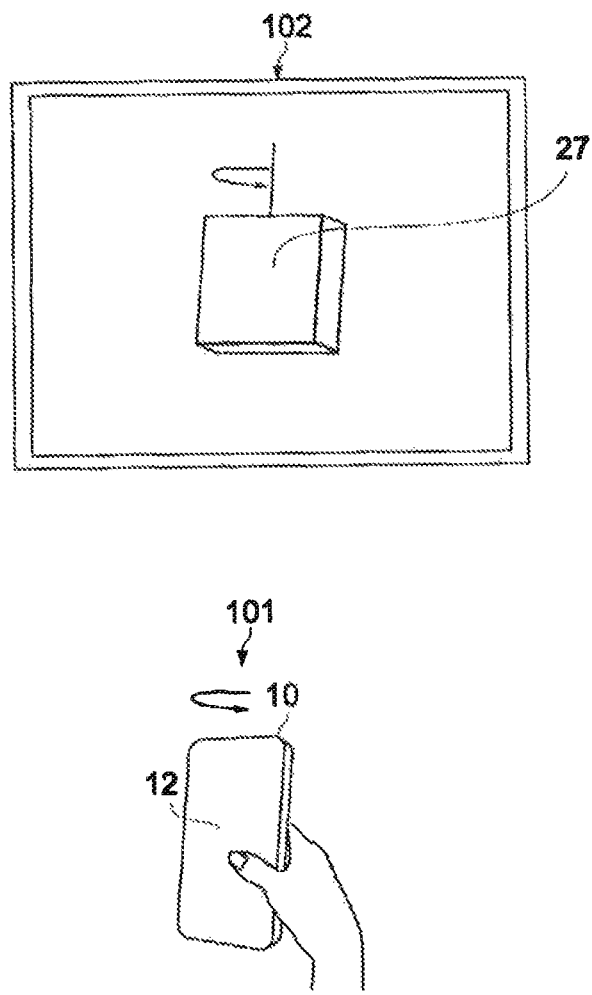
FIG. 24 is a diagram showing an example of a case where an information processing apparatus does not include a display, and a display is separately provided.

FIG. 24 is a diagram showing an example of a case where an information processing apparatus 101 does not include a display 11, and a display is separately provided.

The information processing apparatus 101 shown in FIG. 24 does not include a display 11. A UI such as a three-dimensional display object 27 is displayed on a screen of a display apparatus 102 such as a liquid crystal display apparatus or a television apparatus. In this case, when a user rotates the casing 10 while touching the touch panel 12, the three-dimensional display object 27 is displayed in a rotational manner on the screen.

It should be understood by those skilled in the art that various modifications, combinations, sub-combinations and alterations may occur depending on design requirements and other factors insofar as they are within the scope of the appended claims or the equivalents thereof.

What is claimed is:

1. An apparatus, comprising:
   a display having a screen;
   at least one processor; and
   at least one computer-readable medium encoded with instructions, which when executed by the at least one processor, cause the apparatus to:
      display, on the screen, at least first and second items that correspond, respectively, to first and second commands that can be executed by the apparatus,
      determine, based on an output of at least one sensor in communication with the at least one processor, a rotation angle of the apparatus about an axis parallel to a surface of the screen,
      identify, based at least in part on the determined rotation angle, an operational state of the apparatus, the operational state being identified from among a plurality of states including (a) a first state in which the first item is selectable to cause execution of the first command and the second item is not selectable to cause execution of the second command, and (b) a second state in which the second item is selectable to cause execution of the second command and the first item is not selectable to cause execution of the first command,
      while the first and second items are displayed on the screen, determine a first contact detected by a touch panel,
      execute, in response to determining the first contact, the first command when the apparatus is in the first state, and
      execute, in response to determining the first contact, the second command when the apparatus is in the second state.

2. The apparatus of claim 1, wherein the instructions which cause the apparatus to identify the operational state of the apparatus include instructions which, when executed by the at least one processor, cause the apparatus to:
   determine that the apparatus is in the first state only when the determined rotation angle of the apparatus is within a first range of rotation angles; and
   determine that the apparatus is in the second state only when the determined rotation angle of the apparatus is within a second range of rotation angles, the second range of rotation angles being non-overlapping with the first range of rotation angles.

3. The apparatus of claim 2, wherein the at least one computer-readable medium is encoded with additional instructions which, when executed by the at least one processor, further cause the apparatus to:
   adjust positions of the first and second items displayed on the screen based on the determined rotation angle.

4. The apparatus of claim 3, wherein the instructions which cause the apparatus to adjust positions of the first and second items further include instructions which, when executed by the at least one processor, cause the apparatus to adjust shapes of the first and second items based on the determined rotation angle so as to virtually rotate the first and second items in three-dimensional space.

5. The apparatus of claim 3, wherein the instructions which cause the apparatus to adjust positions of the first and second items further include instructions which, when executed by the at least one processor, cause the apparatus to move a first edge of the first item in a first direction on the screen based on the determined rotation angle.

6. The apparatus of claim 5, wherein the instructions which cause the apparatus to adjust positions of the first and second items further include instructions which, when executed by the at least one processor, cause the apparatus to move a second edge of the second item, which is substantially parallel to the first edge, in the first direction on the screen based on the determined rotation angle.

7. The apparatus of claim 3, wherein the instructions which cause the apparatus to adjust positions of the first and second items further include instructions which, when executed by the at least one processor, further cause the apparatus to:
   alter a rotational perspective of each of the first and second items based on the determined rotation angle.

8. The apparatus of claim 1, wherein the at least one computer-readable medium is encoded with additional instructions which, when executed by the at least one processor, further cause the apparatus to:
   update, based on user operation of the apparatus, a reference angle from which the rotation angle of the apparatus is determined.

9. The apparatus of claim 8, wherein the instructions which cause the apparatus to update the reference angle further include instructions which, when executed by the at least one processor, further cause the apparatus to:
   determine a second contact that corresponds to the user operation and is detected by the touch panel; and
   update the reference angle based on the determined second contact.

10. The apparatus of claim 9, wherein the instructions which cause the apparatus to update the reference angle based on the determined second contact include additional instructions which, when executed by the at least one processor, further cause the apparatus to:
    determine whether the apparatus is in a third state in which the first and second items are not displayed on the screen; and
    update the reference angle based on a determination that the apparatus is in the third state.

11. The apparatus of claim 10, wherein the at least one computer-readable medium is encoded with additional instructions which, when executed by the at least one processor, further cause the apparatus to:
    display the first and second items on the screen based on the determined second contact.

12. The apparatus of claim 11, wherein the instructions which cause the apparatus to determine the first contact include instructions which, when executed by the at least one processor, cause the apparatus to:

determine the first contact while the first and second items are displayed on the screen based on the determined second contact.

13. The apparatus of claim 12, wherein the instructions which cause the apparatus to identify the operational state of the apparatus include instructions which, when executed by the at least one processor, cause the apparatus to:
determine that the apparatus is in the first state when the rotation angle is a first rotation angle; and
determine that the apparatus is in the second state when the rotation angle is a second rotation angle which is larger than the first rotation angle.

14. The apparatus of claim 1, wherein the at least one computer-readable medium is encoded with additional instructions which, when executed by the at least one processor, further cause the apparatus to:
display, on the screen, a background image behind the first and second items;
determine a position of a virtual camera based at least in part on the determined rotation angle; and
change the background image based on the determined position of the virtual camera.

15. The apparatus of claim 1, further comprising the at least one sensor and the touch panel, wherein the at least one sensor is configured to detect rotation of the apparatus about the axis, the touch panel is configured to detect the contact, and the touch panel and the display are arranged so that the touch panel maintains a constant position with respect to the screen during operation of the apparatus.

16. The apparatus of claim 1, wherein the instructions which cause the apparatus to determine the rotation angle of the apparatus include instructions which, when executed by the at least one processor, cause the apparatus to:
determine, based on the output of the at least one sensor in communication with the at least one processor, the rotation angle of the apparatus about the axis parallel to an edge of the surface of the screen.

17. At least one non-transitory computer-readable medium encoded with instructions, which when executed by at least one processor of an apparatus, cause the apparatus to:
display, on a screen of a display of the apparatus, at least first and second items that correspond, respectively, to first and second commands that can be executed by the apparatus;
determine, based on an output of at least one sensor of the apparatus, a rotation angle of the apparatus about an axis parallel to a surface of the screen;
identify, based at least in part on the determined rotation angle, an operational state of the apparatus, the operational state being identified from among a plurality of states including (a) a first state in which the first item is selectable to cause execution of the first command and the second item is not selectable to cause execution of the second command, and (b) a second state in which the second item is selectable to cause execution of the second command and the first item is not selectable to cause execution of the first command;
determine a first contact detected by a touch panel of the apparatus while the first and second items are displayed on the screen;
execute, in response to determining the first contact, the first command when the apparatus is in the first state; and
execute, in response to determining the first contact, the second command when the apparatus is in the second state.

18. The at least one non-transitory computer-readable medium of claim 17, wherein the instructions which cause the apparatus to identify the operational state of the apparatus include instructions which, when executed by the at least one processor, cause the apparatus to:
determine that the apparatus is in the first state only when the determined rotation angle of the apparatus is within a first range of rotation angles; and
determine that the apparatus is in the second state only when the determined rotation angle of the apparatus is within a second range of rotation angles, the second range of rotation angles being non-overlapping with the first range of rotation angles.

19. The at least one non-transitory computer-readable medium of claim 18, encoded with additional instructions which, when executed by the at least one processor, further cause the apparatus to:
adjust positions of the first and second items displayed on the screen based on the determined rotation angle.

20. The at least one non-transitory computer-readable medium of claim 19, wherein the instructions which cause the apparatus to adjust positions of the first and second items further include instructions which, when executed by the at least one processor, cause the apparatus to adjust shapes of the first and second items based on the determined rotation angle so as to virtually rotate the first and second items in three-dimensional space.

21. The at least one non-transitory computer-readable medium of claim 19, wherein the instructions which cause the apparatus to adjust positions of the first and second items further include instructions which, when executed by the at least one processor, cause the apparatus to move a first edge of the first item in a first direction on the screen based on the determined rotation angle.

22. The at least one non-transitory computer-readable medium of claim 17, encoded with additional instructions which, when executed by the at least one processor, further cause the apparatus to:
update, based on user operation of the apparatus, a reference angle from which the rotation angle of the apparatus is determined.

23. The at least one non-transitory computer-readable medium of claim 22, wherein the instructions which cause the apparatus to update the reference angle further include instructions which, when executed by the at least one processor, further cause the apparatus to:
determine a second contact that corresponds to the user operation and is detected by the touch panel; and
update the reference angle based on the determined second contact.

24. The at least one non-transitory computer-readable medium of claim 23, wherein the instructions which cause the apparatus to update the reference angle based on the determined second contact include additional instructions which, when executed by the at least one processor, further cause the apparatus to:
determine whether the apparatus is in a third state in which the first and second items are not displayed on the screen; and
update the reference angle based on a determination that the apparatus is in the third state.

25. The at least one non-transitory computer-readable medium of claim 24, wherein the at least one computer-readable medium is encoded with additional instructions which, when executed by the at least one processor, further cause the apparatus to:

display the first and second items on the screen based on the determined second contact.

26. The at least one non-transitory computer-readable medium of claim 17, encoded with additional instructions which, when executed by the at least one processor, further cause the apparatus to:
    display, on the screen, a background image behind the first and second items;
    determine a position of a virtual camera based at least in part on the determined rotation angle; and
    change the background image based on the determined position of the virtual camera.

27. A method for operating an apparatus comprising a display, at least one sensor, and a touch panel, the method comprising:
    displaying, on a screen of the display, at least first and second items that correspond, respectively, to first and second commands that can be executed by the apparatus;
    determining, based on an output of the at least one sensor, a rotation angle of the apparatus about an axis parallel to a surface of the screen;
    identifying, based at least in part on the rotation angle, an operational state of the apparatus, the operational state being identified from among a plurality of states including (a) a first state in which the first item is selectable to cause execution of the first command and the second item is not selectable to cause execution of the second command, and (b) a second state in which the second item is selectable to cause execution of the second command and the first item is not selectable to cause execution of the first command;
    while the first and second items are displayed on the screen at a first time, determining a first contact detected by the touch panel when the apparatus is in the first state;
    executing, in response to determining the first contact, the first command;
    while the first and second items are displayed on the screen at a second time, determining a second contact detected by the touch panel when the apparatus is in the second state; and
    executing, in response to determining the second contact, the second command.

28. An apparatus, comprising:
    a display having a screen;
    a touch panel arranged to maintain a constant position with respect to the screen during operation of the apparatus;
    at least one sensor to detect rotation of the apparatus about an axis parallel to a surface of the screen;
    at least one processor; and
    at least one computer-readable medium encoded with instructions which, when executed by the at least one processor, cause the apparatus to:
        display, on the screen, at least first and second items that correspond, respectively, to first and second commands that can be executed by the apparatus,
        determine, based on an output of the at least one sensor, a rotation angle of the apparatus about the axis parallel to a surface of the screen,
        identify, based at least in part on the determined rotation angle, an operational state of the apparatus, the operational state being identified from among a plurality of states including (a) a first state in which the first item is selectable to cause execution of the first command and the second item is not selectable to cause execution of the second command, and (b) a second state in which the second item is selectable to cause execution of the second command and the first item is not selectable to cause execution of the first command,
        while the first and second items are displayed on the screen, determine a first contact detected by the touch panel,
        execute, in response to determining the first contact, the first command when the apparatus is in the first state,
        execute, in response to determining the first contact, the second command when the apparatus is in the second state,
        determine a second contact detected by the touch panel, and
        update, based on the determined second contact, a reference angle from which the rotation angle of the apparatus is determined.

29. The apparatus of claim 28, wherein the instructions which cause the apparatus to update the reference angle based on the determined second contact include additional instructions which, when executed by the at least one processor, further cause the apparatus to:
    determine whether the apparatus is in a third state in which the first and second items are not displayed on the screen; and
    update the reference angle based on a determination that the apparatus is in the third state.

30. The apparatus of claim 29, wherein the at least one computer-readable medium is encoded with additional instructions which, when executed by the at least one processor, further cause the apparatus to:
    display the first and second items on the screen based on the determined second contact.

* * * * *